United States Patent
Faxér et al.

(10) Patent No.: US 12,081,382 B2
(45) Date of Patent: Sep. 3, 2024

(54) SYSTEMS AND METHODS REGARDING FREQUENCY- SELECTIVE SRS TRANSMISSION AND PUSCH PRECODING

(71) Applicant: Telefonaktiebolaget LM Ericsson (publ), Stockholm (SE)

(72) Inventors: Sebastian Faxér, Järfälla (SE); Andreas Nilsson, Gothenburg (SE); Robert Mark Harrison, Grapevine, TX (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1035 days.

(21) Appl. No.: 16/760,346

(22) PCT Filed: Nov. 16, 2018

(86) PCT No.: PCT/SE2018/051188
§ 371 (c)(1),
(2) Date: Apr. 29, 2020

(87) PCT Pub. No.: WO2019/098935
PCT Pub. Date: May 23, 2019

(65) Prior Publication Data
US 2023/0217429 A1    Jul. 6, 2023

Related U.S. Application Data

(60) Provisional application No. 62/587,520, filed on Nov. 17, 2017.

(51) Int. Cl.
*H04W 72/1268* (2023.01)
*H04L 5/00* (2006.01)
*H04L 27/26* (2006.01)

(52) U.S. Cl.
CPC ........ *H04L 27/2613* (2013.01); *H04L 5/0048* (2013.01); *H04L 5/0051* (2013.01); *H04L 27/2634* (2013.01); *H04W 72/1268* (2013.01)

(58) Field of Classification Search
None
See application file for complete search history.

(56) References Cited

U.S. PATENT DOCUMENTS

2009/0245148 A1    10/2009  McCoy
2013/0195086 A1     8/2013  Xu et al.
(Continued)

FOREIGN PATENT DOCUMENTS

JP    2013236288 A    11/2013
WO    2011142640 A2   11/2011
(Continued)

OTHER PUBLICATIONS

Author Unknown, "Technical Specification Group Radio Access Network; NR; Physical channels and modulation (Release 15)," Technical Specification 38.211, Version 1.0.0, 3GPP Organizational Partners, Sep. 2017, 37 bages.

(Continued)

*Primary Examiner* — Steve R Young
(74) *Attorney, Agent, or Firm* — Withrow & Terranova, PLLC

(57) ABSTRACT

Systems and methods relating to frequency-selective Sounding Reference Signal (SRS) precoding and uplink transmission are disclosed. In some embodiments, a method of operation of a wireless device comprises transmitting SRS on a first set of frequency-domain resources, and receiving an uplink scheduling assignment for an uplink physical channel comprising a resource allocation of a second set of frequency-domain resources comprising: (a) one or more frequency-domain resources that are also included in the
(Continued)

first set and (b) one or more frequency-domain resources that are not included in the first set. In order to form a precoded uplink channel, the method further comprises: for each frequency-domain resource in (a), applying a same precoding as applied to the SRS on the frequency-domain resource; and, for each frequency-domain resource in (b), applying a same precoding as applied to the SRS on a different frequency-domain resource. The method further comprises transmitting the precoded uplink channel.

8 Claims, 14 Drawing Sheets

(56) References Cited

U.S. PATENT DOCUMENTS

| | | | |
|---|---|---|---|
| 2013/0329660 A1 | 12/2013 | Noh | |
| 2014/0219199 A1 | 8/2014 | Ji et al. | |
| 2017/0366380 A1* | 12/2017 | Hwang | H04W 56/0045 |
| 2018/0097595 A1* | 4/2018 | Huang | H04L 1/0009 |
| 2020/0067663 A1* | 2/2020 | Liu | H04W 72/1268 |
| 2021/0136748 A1* | 5/2021 | Choi | H04L 5/0051 |
| 2021/0360672 A1* | 11/2021 | Kim | H04W 72/0446 |
| 2022/0007298 A1* | 1/2022 | Huang | H04W 52/40 |

FOREIGN PATENT DOCUMENTS

| | | |
|---|---|---|
| WO | 2012167589 A1 | 12/2012 |
| WO | 2013153269 A1 | 10/2013 |
| WO | 2017078464 A1 | 5/2017 |
| WO | 2017126907 A1 | 7/2017 |
| WO | 2017133440 A1 | 8/2017 |

OTHER PUBLICATIONS

Author Unknown, "Technical Specification Group Radio Access Network; NR; Physical layer procedures for data (Release 15)," Technical Specification 38.214, Version 1.0.0, 3GPP Organizational Partners, Sep. 2017, 32 pages.

Author Unknown, "Technical Specification Group Radio Access Network; NR; Radio Resource Control (RRC); Protocol specification (Release 15)," Technical Specification 38.331, Version 0.1.0, 3GPP Organizational Partners, Oct. 2017, 42 pages.

CATT, "R1-1715795: Discussion on non-codebook based transmission for UL," Third Generation Partnership Project (3GPP), TSG RAN WG1 Meeting NR#3, Sep. 18-21, 2017, 4 pages, Nagoya, Japan.

Ericsson, "R1-1718426: Ul Mimo for non-codebook based transmission," Third Generation Partnership Project (3GPP), TSG RAN WG1 Meeting 90bis, Oct. 9-13, 2017, 5 pages, Prague, CZ.

Qualcomm Incorporated, "R1-1718537: Non-Codebook Based UL Transmission," Third Generation Partnership Project (3GPP), TSG RAN WG1 Meeting #90bis, Oct. 9-13, 2017, 4 pages, Prague, Czech.

International Search Report and Written Opinion for International Patent Application No. PCT/SE2018/051188, mailed May 3, 2019, 17 pages.

Notification to Grant for Chinese Patent Application No. 201880074116.6, mailed May 26, 2023, 6 pages.

First Office Action for Chinese Patent Application No. 201880074116.6, mailed Jan. 19, 2023, 8 pages.

Huawei, et al., "R1-1709923: Non-codebook based transmission for UL MIMO," 3GPP TSG RAN WG1 NR Ad Hoc Meeting, Qingdao, China, Jun. 27-30, 2017, 7 pages.

Extended European Search Report for European Patent Application No. 18879926.6, mailed Jun. 23, 2021, 4 pages.

* cited by examiner ial patent application Ser. No. 62/587,520, filed Nov. 17, 2017, the disclosures of which are hereby incorporated herein by reference in its entirety their entireties.

SYSTEMS AND METHODS REGARDING FREQUENCY-SELECTIVE SRS TRANSMISSION AND PUSCH PRECODING

RELATED APPLICATIONS

This application is a 35 U.S.C. § 371 national phase filing of International Application No. PCT/SE2018/051188, filed Nov. 16, 2018, which claims the benefit of provisional patent application Ser. No. 62/587,520, filed Nov. 17, 2017, the disclosures of which are hereby incorporated herein by reference in its entirety their entireties.

TECHNICAL FIELD

The present disclosure relates a wireless communication system (e.g., a cellular communication system) and more particularly relates to frequency-selective Sounding Reference Signal (SRS) transmission and Physical Uplink Shared Channel (PUSCH) precoding.

BACKGROUND

It is expected that large parts of future Third Generation Partnership Project (3GPP) New Radio (NR) networks will be deployed for Time Division Duplexing (TDD). One benefit with TDD (compared to Frequency Division Duplexing (FDD)) is that TDD enables reciprocity based beamforming, which can be applied both at the Transmit/Receive Point (TRP) (i.e., for downlink) and the User Equipment device (UE) (i.e., for uplink). For reciprocity based downlink transmission, it is expected that the UE will transmit Sounding Reference Signals (SRSs), which the TRP will use to estimate the channel between the TRP and the UE. The channel estimate will then be used at the TRP to find optimal precoding weights for the coming downlink transmission, for example by using Eigen-beamforming. In similar way, it is expected that Channel State Information Reference Signal (CSI-RS) will be used as a sounding signal for reciprocity based uplink transmissions. It has been agreed in NR that a TRP can indicate a Quasi Co-Location (QCL) assumption to an earlier transmitted downlink reference signal (e.g., CSI-RS) that a UE may use when determining uplink precoding.

Codebook-Based Uplink Transmission

Multi-antenna techniques can significantly increase the data rates and reliability of a wireless communication system. The performance is in particular improved if both the transmitter and the receiver are equipped with multiple antennas, which results in a Multiple Input Multiple Output (MIMO) communication channel. Such systems and/or related techniques are commonly referred to as MIMO.

The NR standard is currently being specified. A core component in NR is the support of MIMO antenna deployments and MIMO related techniques. It is expected that NR will support uplink MIMO with at least four layer spatial multiplexing using at least four antenna ports with channel dependent precoding. The spatial multiplexing mode is aimed for high data rates in favorable channel conditions. An illustration of the precoded spatial multiplexing operation in NR is provided in FIG. 1 for where Cyclic Prefix Orthogonal Frequency Division Multiplexing (CP-OFDM) is used on the uplink.

As seen, the information carrying symbol vector s is multiplied by an NT x r precoder matrix W, which serves to distribute the transmit energy in a subspace of the NT (corresponding to NT antenna ports) dimensional vector space. The precoder matrix is typically selected from a codebook of possible precoder matrices, and is typically indicated by means of a Transmit Precoder Matrix Indicator (TPMI), which specifies a unique precoder matrix in the codebook for a given number of symbol streams. The r symbols in s each correspond to a layer and r is referred to as the transmission rank. In this way, spatial multiplexing is achieved since multiple symbols can be transmitted simultaneously over the same Time/Frequency Resource Element (TFRE). The number of symbols r is typically adapted to suit the current channel properties.

The received NR x 1 vector yn for a certain TFRE on subcarrier n (or alternatively data TFRE number n) is thus modeled by:

$$y_n = H_n W s_n + e_n \quad \text{Eq. 1}$$

where $e_n$ is a noise/interference vector obtained as realizations of a random process. The precoder W can be a wideband precoder, which is constant over frequency, or frequency selective.

The precoder matrix W is often chosen to match the characteristics of the NR x NT MIMO channel matrix $H_n$, resulting in so-called channel dependent precoding. This is also commonly referred to as closed-loop precoding and essentially strives for focusing the transmit energy into a subspace which is strong in the sense of conveying much of the transmitted energy to the UE. In addition, the precoder matrix may also be selected to strive for orthogonalizing the channel, meaning that after proper linear equalization at the UE, the inter-layer interference is reduced.

One example method for a UE to select a precoder matrix W can be to select the $W_k$ that maximizes the Frobenius norm of the hypothesized equivalent channel:

$$\max_k \left\| \hat{H}_n W_k \right\|_F^2 \quad \text{Eq. 2}$$

where
  $\hat{H}_n$ is a channel estimate, derived from the transmitted SRS;
  $W_k$ is a hypothesized precoder matrix with index k; and
  $\hat{H}_n W_k$ is the hypothesized equivalent channel.

In closed-loop precoding for the NR uplink, the TRP transmits, based on channel measurements in the reverse link (uplink), TPMI to the UE that the UE should use on its uplink antennas. The NR Node B (gNB) configures the UE to transmit SRS according to the number of UE antennas it would like the UE to use for uplink transmission to enable the channel measurements. A single precoder that is supposed to cover a large bandwidth (wideband precoding) may be signaled. It may also be beneficial to match the frequency variations of the channel and instead feedback a frequency-selective precoding report, e.g. several precoders and/or several TPMIs, one per sub-band.

Other information than TPMI is generally used to determine the uplink MIMO transmission state, such as SRS Resource Indicators (SRIs) as well as Transmission Rank Indicators (TRIs). These parameters, as well as the Modulation and Coding State (MCS), and the uplink resources where Physical Uplink Shared Channel (PUSCH) is to be transmitted, are also determined by channel measurements derived from SRS transmissions from the UE. The transmission rank, and thus the number of spatially multiplexed layers, is reflected in the number of columns of the precoder W. For efficient performance, it is important that a transmission rank that matches the channel properties is selected.

UE Coherence Capability in NR

Depending on UE implementation, it may be possible to maintain the relative phase of the transmit chains. In this case, the UE can form an adaptive array by selecting a beam on each transmit chain, and by transmitting the same modulation symbol on the selected beams of both transmit chains using different gain and/or phase between the transmit chains. This transmission of a common modulation symbol or signal on multiple antenna elements with controlled phase can be labeled 'coherent' transmission. The support for a coherent uplink MIMO transmission in Long Term Evolution (LTE) Release (Rel) 10 is indicated via a feature group indication for relative transmit phase continuity for uplink spatial multiplexing, wherein a UE indicates if it can adequately maintain the relative phase of transmit chains over time in order to support coherent transmission.

In other UE implementations, the relative phase of the transmit chains may not be well controlled, and coherent transmission may not be used. In such implementations, it may still be possible to transmit on one of the transmit chains at a time, or to transmit different modulation symbols on the transmit chains. In the latter case, the modulation symbols on each transmit chain may form a spatially multiplexed, or 'MIMO,' layer. This class of transmission may be referred to as 'non-coherent' transmission. Such non-coherent transmission schemes may be used by LTE Rel-10 UEs with multiple transmit chains, but that do not support relative transmit phase continuity.

In still other UE implementations, the relative phase of a subset of the transmit chains is well controlled, but not over all transmit chains. One possible example is described above with respect to multi-panel operation, where phase is well controlled among transmit chains within a panel, but phase between panels is not well controlled. This class of transmission may be referred to as 'partially-coherent.'

All three of these variants of relative phase control have been agreed for support in NR, and so UE capabilities have been defined for full coherence, partial coherence, and non-coherent transmission.

Non-Codebook Based Uplink Transmission

In LTE releases through Rel-15, spatially multiplexed uplink transmission is supported using codebook based transmission, where a single precoding matrix signaled to the UE using a TPMI is applied by the UE across the entire allocated bandwidth. The relative phase among SRS ports is assumed to be sufficiently constant in time such that the relative phase measured on SRS ports in one subframe can be used by the enhanced or evolved Node B (eNB) to determine the precoding matrix the UE should use in a subsequent subframe. Furthermore, in order to not degrade channel estimation at the gNB, the UE should not frequency selectively precode the SRS or PUSCH in a way that would induce more frequency selectivity than would be expected from radio propagation. Consequently, LTE SRS transmission can be considered 'non-precoded,' since SRS ports should have relative phase that is slowly varying across time and frequency and be transmitted with an antenna pattern that varies slowly across time and frequency. Non-precoded operation is also defined for NR, and similar behaviors to LTE for PUSCH and SRS will likely be assumed.

In addition to codebook-based uplink transmission, it has been agreed that NR will support a non-codebook based transmission modes, which are applicable at least when Transmission/Reception (TX/RX) reciprocity holds at the UE. In the codebook-based mode, the gNB does not signal a TPMI to the UE and, as stated earlier, the UE typically transmits a non-precoded SRS to sound the uplink channel and the gNB determines a preferred precoder from the codebook based on the SRS channel estimates and instructs the UE to apply said precoder on the PUSCH transmission by means of a TPMI comprised in the uplink grant.

For non-codebook based uplink transmission however, the UE itself determines one or more precoder candidates and uses said precoder candidates to precode one or more SRSs in one or more SRS resources. The gNB correspondingly determines one or more preferred SRS resources and instructs the UE to use the precoder(s) applied for precoding the one or more preferred SRS resources also for the PUSCH transmission. This instruction may be signaled in the form of one or more SRI(s) comprised in the Downlink Control Information (DCI) carrying the uplink grant, but may alternatively or additionally include TRI signaling. Since SRS resource indication is only needed when more than one SRS is configured to a UE, a UE is not configured to receive SRI(s) unless it is also configured with more than one SRS resource.

The bandwidth of an SRS resource is Radio Resource Control (RRC) configured and the SRS can span either the full bandwidth the UE is configured to operate with, or a smaller sub-band, where the sub-band can be defined with a granularity of four Physical Resource Blocks (PRBs). One reason a UE may be configured to transmit SRS on a smaller Bandwidth (BW) is to concentrate the available transmit power onto the smaller BW in order to increase the power spectral density and achieve better coverage of the SRS transmission.

The precoding of the SRS can either be constant over the entire SRS BW ("wideband precoding"), or, the precoding can change across SRS BW ("frequency-selective precoding"). In the latter case, the SRS BW is divided into different sub-bands, where the sub-band size is determined by a configured "Physical Resource Block Group (PRG) size" which may be part of the SRS configuration. The precoding of the SRS is constant over a sub-band but may change between sub-bands.

It has been decided that wideband SRI indication is used for non-codebook based PUSCH transmission. That is, only a single set of SRI(s) is conveyed in the uplink grant. These SRI(s) are then applicable for the entire scheduled bandwidth as indicated by the uplink grant. Note that there is no connection between scheduled bandwidth and the bandwidth of the indicated SRS resources. Typically, the gNB would schedule the UE on PRBs that have been previously sounded by an SRS, but this is not required.

For the UE to determine the uplink precoder candidates, it needs to measure a downlink reference signal such as a CSI-RS in order to attain a downlink channel estimate. Based on this downlink channel estimate, and assuming TX/RX reciprocity holds, the UE can convert the downlink channel estimate into an uplink channel estimate and use the uplink channel estimate to determine a set of uplink precoder candidates, for instance by performing a Singular Value Decomposition (SVD) of the uplink channel estimate or by other established precoder determination methods. Typically, the gNB would configure the UE, implicitly or explicitly, with which CSI-RS resource it can use to aid precoder candidate determination. In some proposals for NR, this may be done by indicating that a certain CSI-RS resource is reciprocally spatially quasi co-located with the SRS resource(s) the UE is scheduled to use for uplink sounding, for instance as a part of RRC configuration.

SRS Transmission Setting

How the SRS transmission should be done, for example which SRS resource to use, the number of ports per SRS resource, etc., needs to be signaled to the UE from the TRP. One way to solve this (in a low overhead way) is to predefine a set of "SRS transmission settings" using higher layer signaling (e.g., RRC) and then indicate in DCI which "SRS transmission setting" that the UE should apply. An "SRS transmission setting" can for example contain information regarding which SRS resources and SRS ports that the UE should use in the coming SRS transmission.

Exactly how SRS transmissions are configured and triggered for NR is still under discussion. A text proposal to 3GPP Technical Specification (TS) 38.331 defining the SRS related parameters are given below.

SRS-Config

The SRS-Config Information Element (IE) is used to configure SRS transmissions. The configuration defines a list of SRS-Resources and a list of SRS-ResourceSets. Each resource set defines a set of SRS-Resources. The network triggers the transmission of the set of SRS-Resources using a configured aperiodicSRS-ResourceTrigger (that is carried in physical layer DCI, 'L1 DCI').

| SRS-Config information element |
|---|
| -- ASN1START |
| -- SRS configuration allowing to add and remove sets of SRS resources |
| SRS-Config : :=                        SEQUENCE { |
|   srs-ResourceSetToReleaseList         SEQUENCE (SIZE (0. . . maxNrofSRS-ResourceSets) OF |
| SRS-ResourceSetId   OPTIONAL,          -- Need ON |
|   srs-ResourceSetToAddModList          SEQUENCE (SIZE (0. . . maxNrofSRS-ResourceSets) OF |
| SRS-ResourceSet   OPTIONAL             -- Need ON |
|   srs-ResourceToReleaseList            SEQUENCE (SIZE (1. . . maxNrofSRS-Resources) ) OF |
| SRS-ResourceId   OPTIONAL,             -- Need ON |
|   srs-ResourceToAddModList             SEQUENCE (SIZE (1. . . maxNrofSRS-Resources) ) OF |
| SRS-Resource         OPTIONAL          -- Need ON |
|   -- Configuration of simultaneous SRS and PUCCH (see 38.214, section 6.2.1) |
|   pucch-SRS-SimultaneousTransmission      BOOLEAN |
| } |
| -- A set of SRS resources |
| SRS-ResourceSet : :=                   SEQUENCE { |
|   srs-ResourceSetId                    SRS-ResourceSetId |
|   srs-ResourcesIds                     SEQUENCE (SIZE (1 . . . maxNrofSRS-ResourcesPerSet) ) OF SRS-ResourceId |
|   -- The DCI "code point" upon which the UE shall transmit SRS according to this SRS resource set configuration. |
|   -- (see 38.214, section x.x.x.x) |
|   aperiodicSRS-ResourceTrigger         TYPE_FFS! |
| } |
| SRS-ResourceSetId : :=                 INTEGER (0. . . maxNrofSRS-ResourceSets-1) |
| SRS-Resource : :=                      SEQUENCE { |
|   srs-ResourceId                       SRS-ResourceId, |
|   nrofSRS-Ports                        ENUMERATED {1port, 2ports, 4ports }, |
|   -- Comb value (2 or 4) and comb offset (see 38.214, section 6.2.1) |
|   transmissionComb                     ENUMERATED {n2, n4}, |
|   -- OFDM symbol location of the SRS resource within a slot including number of |
|   -- OFDM symbols (1, 2, or 4 per SRS resource) (see 38.214, section 6.2.1) |
|   resourceMapping                      TYPE_FFS!, |
|   -- Includes parameters capturing SRS frequency hopping (see 38.214, section 6.2.1) |
|   freqHopping                          TYPE_FFS!, |
|   -- Time domain behavior of SRS resource configuration (see 38.214, section 6.2.1) |
|   resourceType                         TYPE_FFS!, |
|   -- Periodicity and slot offset for periodic/semi-persistent SRS (see 38.214, section 6.2.1) |
|   slotConfiguration                    TYPE_FFS!, |
|   -- Wideband and partial band SRS (see 38.214, section 6.2.1) |
|   freqBand                             TYPE_FFS!, |
|   -- ADD DESCRIPTION (see 38.214, section 6.2.1) |
|   sequenceId                           TYPE_FFS!, |
| } |
| SRS-ResourceId : :=                    INTEGER (0. . . maxNrofSRS-Resources-1) |

Thus, the RRC configuration of "SRS transmission settings" are done with the IE SRS-Config, which contains a list of SRS-Resources (the list constitutes a "pool" of resources) wherein each SRS resource contains information of the physical mapping of the reference signal on the time-frequency grid, time-domain information, sequence Identifiers (IDs), etc. The SRS-Config also contains a list of SRS resource sets, which contains a list of SRS resources and an associated DCI trigger state. Thus, when a certain DCI state is triggered, it indicates that the SRS resources in the associated set shall be transmitted by the UE.

SUMMARY

Systems and methods relating to frequency-selective Sounding Reference Signal (SRS) precoding and uplink transmission are disclosed. In some embodiments, a method of operation of a wireless communication device for transmitting a physical uplink channel in a wireless communication system comprises transmitting an SRS on a first set of frequency-domain resources and receiving an uplink scheduling assignment for an uplink physical channel. The uplink scheduling assignment comprises a resource allocation of a second set of frequency-domain resources. The second set of frequency-domain resources comprises: (a) one or more frequency-domain resources that are also included in the first set of frequency-domain resources and (b) one or more frequency-domain resources that are not included in the first set of frequency-domain resources. The method further comprises, in order to form a precoded uplink channel, for each frequency-domain resource of one or more frequency-domain resources comprised in both the first set of frequency-domain resources and the second set of frequency-domain resources, applying a same precoding to the uplink physical channel on the frequency-domain resource as applied to the SRS on the frequency-domain resource. The method further comprises, in order to form a precoded uplink channel, for each frequency-domain resource of the one or more frequency-domain resources comprised in the second set of frequency-domain resources but not included in the first set of frequency-domain resources, applying a same precoding to the uplink physical channel on the frequency-domain resource as applied to the SRS on a different frequency-domain resource. The method further comprises transmitting the precoded uplink channel.

In some embodiments, the uplink scheduling assignment further comprises an indication to apply the same precoding to the physical uplink channel as applied to the transmitted SRS.

In some embodiments, for each frequency-domain resource of the one or more frequency-domain resources comprised in the second set of frequency-domain resources but not included in the first set of frequency-domain resources, applying the same precoding to the uplink physical channel on the frequency-domain resource as applied to the SRS on the different frequency-domain resource comprises applying the same precoding to the uplink physical channel on the frequency-domain resource as applied to the SRS on another frequency-domain resource that is: (a) in the first set of frequency-domain resources and (b) minimizes an absolute distance in resource index from the frequency-domain resource.

In some embodiments, the precoding applied to the SRS on a first frequency-domain resource in the first set of frequency-domain resources is different than the precoding applied to the SRS on a second frequency-domain resource in the first set of frequency-domain resources.

In some embodiments, transmitting the SRS on the first set of frequency-domain resources comprises transmitting the SRS on one or more SRS resources in the first set of frequency-domain resources. The SRS is frequency-selectively precoded such that a precoder used to precode the SRS in a first subset of the first set of frequency-domain resources is different than a precoder used to precode the SRS in a second subset of the first set of frequency-domain resources. The first subset and the second subset are non-overlapping.

Embodiments of a wireless communication device are also disclosed. In some embodiments, a wireless communication device for transmitting a physical uplink channel in a wireless communication system comprises one or more transmitters, one or more receivers, and processing circuitry configured to cause the wireless communication device to transmit an SRS on a first set of frequency-domain resources and receive an uplink scheduling assignment for an uplink physical channel. The uplink scheduling assignment comprises a resource allocation of a second set of frequency-domain resources. The second set of frequency-domain resources comprises: (a) one or more frequency-domain resources that are also included in the first set of frequency-domain resources and (b) one or more frequency-domain resources that are not included in the first set of frequency-domain resources. In order to form a precoded uplink channel, the processing circuitry is further configured to cause the wireless communication device to, for each frequency-domain resource of one or more frequency-domain resources comprised in both the first set of frequency-domain resources and the second set of frequency-domain resources, apply a same precoding to the uplink physical channel on the frequency-domain resource as applied to the SRS on the frequency-domain resource. Further, for each frequency-domain resource of the one or more frequency-domain resources comprised in the second set of frequency-domain resources but not included in the first set of frequency-domain resources, the processing circuitry is further configured to cause the wireless communication device to apply a same precoding to the uplink physical channel on the frequency-domain resource as applied to the SRS on a different frequency-domain resource. The processing circuitry is further configured to cause the wireless communication device to transmit the precoded uplink channel.

In some embodiments, the uplink scheduling assignment further comprises an indication to apply the same precoding to the physical uplink channel as applied to the transmitted SRS.

In some embodiments, for each frequency-domain resource of the one or more frequency-domain resources comprised in the second set of frequency-domain resources but not included in the first set of frequency-domain resources, in order to apply the same precoding to the uplink physical channel on the frequency-domain resource as applied to the SRS on the different frequency-domain resource, the processing circuitry is further configured to cause the wireless communication device to apply the same precoding to the uplink physical channel on the frequency-domain resource as applied to the SRS on another frequency-domain resource that is: (a) in the first set of frequency-domain resources and (b) minimizes an absolute distance in resource index from the frequency-domain resource.

In some embodiments, the precoding applied to the SRS on a first frequency-domain resource in the first set of frequency-domain resources is different than the precoding applied to the SRS on a second frequency-domain resource in the first set of frequency-domain resources.

In some embodiments, in order to transmit the SRS on the first set of frequency-domain resources, the processing circuitry is further configured to cause the wireless communication device to transmit the SRS on one or more SRS resources in the first set of frequency-domain resources. The SRS is frequency-selectively precoded such that a precoder used to precode the SRS in a first subset of the first set of frequency-domain resources is different than a precoder used to precode the SRS in a second subset of the first set of frequency-domain resources. The first subset and the second subset are non-overlapping.

In some other embodiments, a method of operation of a wireless communication device for transmitting a physical uplink channel in a wireless communication system comprises transmitting an SRS in a first time instant using a first precoder on a first set of subcarriers, where the first set of subcarriers is comprised within a first resource group of subcarriers over which precoders are presumed to remain constant. The method further comprises transmitting the SRS in a second time instant after the first time instant using a second precoder on a second set of subcarriers. The second set of subcarriers is comprised within a second resource group of subcarriers over which precoders are presumed to remain constant. The method further comprises transmitting a physical uplink channel that occupies at least part of the first resource group and at least part of the second resource group such that a network node of the wireless communication system can assume that the first precoder and the second precoder are used to transmit the physical uplink channel on the first resource group and the second resource group, respectively.

In some embodiments, transmitting the physical uplink channel comprises transmitting the physical uplink channel such that the first precoder is applied to a portion of the physical uplink channel comprised in the at least part of the first resource group and the second precoder is applied to a portion of the physical uplink channel comprised in the at least part of the second resource group.

In some other embodiments, a wireless communication device for transmitting a physical uplink channel in a wireless communication system comprises one or more transmitters, one or more receivers, and processing circuitry configured to cause the wireless communication device to transmit an SRS in a first time instant using a first precoder on a first set of subcarriers, where the first set of subcarriers is comprised within a first resource group of subcarriers over which precoders are presumed to remain constant. The processing circuitry is further configured to cause the wireless communication device to transmit the SRS in a second time instant after the first time instant using a second precoder on a second set of subcarriers. The second set of subcarriers is comprised within a second resource group of subcarriers over which precoders are presumed to remain constant. The processing circuitry is further configured to cause the wireless communication device to transmit a physical uplink channel that occupies at least part of the first resource group and at least part of the second resource group such that a network node of the wireless communication system can assume that the first precoder and the second precoder are used to transmit the physical uplink channel on the first resource group and the second resource group, respectively.

In some embodiments, in order to transmit the physical uplink channel, the processing circuitry is further configured to cause the wireless communication device to transmit the physical uplink channel such that the first precoder is applied to a portion of the physical uplink channel comprised in the at least part of the first resource group and the second precoder is applied to a portion of the physical uplink channel comprised in the at least part of the second resource group.

In some other embodiments, a method of operation of a wireless communication device for transmitting an uplink physical channel in a wireless communication system comprises receiving signaling that configures the wireless communication device to receive an SRS resource indication. The method further comprises expecting that the wireless communication device will not be configured with a Physical Resource Block Group (PRG) size that is less than the scheduled bandwidth or expecting that the wireless communication device will not be configured with a PRG size. The method further comprises receiving the SRS resource indication and transmitting the uplink physical channel according to the SRS resource indication.

In some embodiments, the wireless communication device uses a single precoder over an entire bandwidth scheduled for an uplink physical channel when SRS resource indication and/or precoded SRSs are configured.

In some other embodiments, a wireless communication device for transmitting a physical uplink channel in a wireless communication system comprises one or more transmitters, one or more receivers, and processing circuitry configured to cause the wireless communication device to receive signaling that configures the wireless communication device to receive an SRS resource indication. The processing circuitry is further configured to cause the wireless communication device to expect that the wireless communication device will not be configured with a PRG size that is less than the scheduled bandwidth or expect that the wireless communication device will not be configured with a PRG size. The processing circuitry is further configured to cause the wireless communication device to receive the SRS resource indication and transmitting the uplink physical channel according to the SRS resource indication.

In some embodiments, the wireless communication device uses a single precoder over an entire bandwidth scheduled for an uplink physical channel when SRS resource indication and/or precoded SRSs are configured.

In some other embodiments, a method of operation of a wireless communication device for transmitting an uplink physical channel in a wireless communication system comprises indicating, by the wireless communication device, that it is only capable of non-coherent transmission and receiving signaling that configures the wireless communication device to receive an SRS resource indication. The method further comprises expecting, by the wireless communication device, that: the wireless communication device will not be configured with a PRG size less than the full scheduled bandwidth; the wireless communication device will not be configured with a PRG size; and/or the wireless communication device will not be configured to transmit precoded SRS. The method further comprises receiving the SRS resource indication and transmitting the uplink physical channel according to the SRS resource indication.

In some other embodiments, a wireless communication device for transmitting a physical uplink channel in a wireless communication system comprises one or more transmitters, one or more receivers, and processing circuitry configured to cause the wireless communication device to indicate, by the wireless communication device, that it is only capable of non-coherent transmission and receive signaling that configures the wireless communication device to receive an SRS resource indication. The processing circuitry is further configured to cause the wireless communication device to expect that: the wireless communication device will not be configured with a PRG size less than the full scheduled bandwidth; the wireless communication device will not be configured with a PRG size; and/or the wireless communication device will not be configured to transmit precoded SRS. The processing circuitry is further configured to cause the wireless communication device to receive the SRS resource indication and transmitting the uplink physical channel according to the SRS resource indication.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

Figure 1:
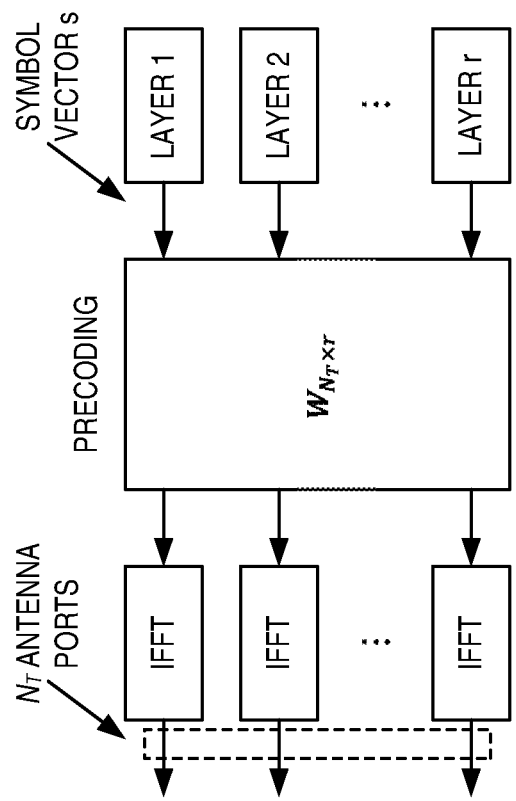
FIG. 1 is an illustration of the precoded spatial multiplexing operation in New Radio (NR)

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

Radio Node: As used herein, a "radio node" is either a radio access node or a wireless device.

Radio Access Node: As used herein, a "radio access node" or "radio network node" is any node in a radio access network of a cellular communications network that operates to wirelessly transmit and/or receive signals. Some examples of a radio access node include, but are not limited to, a base station (e.g., a New Radio (NR) Node B (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), and a relay node.

Core Network Node: As used herein, a "core network node" is any type of node in a core network. Some examples of a core network node include, e.g., a Mobility Management Entity (MME), a Packet Data Network Gateway (P-GW), a Service Capability Exposure Function (SCEF), or the like.

Wireless Device: As used herein, a "wireless device" is any type of device that has access to (i.e., is served by) a cellular communications network by wirelessly transmitting and/or receiving signals to a radio access node(s). Some examples of a wireless device include, but are not limited to, a User Equipment device (UE) in a 3GPP network and a Machine Type Communication (MTC) device.

Network Node: As used herein, a "network node" is any node that is either part of the radio access network or the core network of a cellular communications network/system.

Frequency-Domain Resource: As used herein, a "frequency-domain resource" is any type of physical resource or group of physical resources in the frequency-domain. Examples of a frequency-domain resource include a subcarrier e.g., in an Orthogonal Frequency Division Multiplexing (OFDM) system, a Physical Resource Block (PRB), a Precoding Resource Block Group (PRG), and a sub-band (e.g., a portion of a system bandwidth of the communication system such as, e.g., one of multiple sub-bands used for frequency selective precoding of Sounding Reference Signal (SRS)).

Time-instant: As used herein, a "time-instant" is any type of physical time resource. Some examples of a time instant include an OFDM symbol, a slot, and a subframe.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell;" however, particularly with respect to 5G NR concepts, beams may be used instead of cells and, as such, it is important to note that the concepts described herein are equally applicable to both cells and beams.

There currently exist certain challenge(s). When a UE is scheduled with a Physical Uplink Shared Channel (PUSCH) transmission and is indicated with an SRS resource in the uplink grant, the UE applies the same precoding on the PUSCH as the UE used to precode the indicated SRS resource. If frequency-selective precoding of the SRS is used, the precoding of the PUSCH on each sub-band follows the precoding that was used on the SRS for the corresponding sub-band. However, the PUSCH resource allocation and the SRS frequency-occupancy may not necessarily span the same PRBs, and it is possible that the UE is scheduled on PRBs where no SRS has been transmitted. It is thus unclear what precoding the UE is to apply on these PRBs.

UEs operating with non-codebook based precoding but that only support non-coherent transmission will be able to transmit multiple spatially multiplexed layers, and can select which antennas to carry the spatially multiplexed layers. However, such UEs will not precode across antennas carrying a given spatial layer. It is unclear how such UEs behave with respect to frequency selective transmission and/or precoded SRS.

Certain aspects of the present disclosure and their embodiments may provide solutions to the aforementioned or other challenges. In some embodiments, when indicated with an SRS Resource Indicator (SRI) in Downlink Control Information (DCI) (also referred to herein as a DCI message) scheduling a PUSCH transmission and where the PUSCH resource allocation comprises resource blocks where the indicated SRS resource has not been transmitted, the UE applies the precoding applied to the SRS on the closest resource block where the SRS was transmitted.

In some embodiments, for a PUSCH frequency band that is outside of the SRS frequency band, the UE uses the same precoder as the SRS precoder used for the sub-band closest to the extra PUSCH frequency band.

There are, proposed herein, various embodiments which address one or more of the issues disclosed herein.

In some embodiments, a method performed in a wireless device for transmitting an uplink physical channel is provided, wherein the method comprises: (a) transmitting an SRS on a first set of frequency-domain resource blocks, where the signal transmitted on each resource block is precoded with a precoder; (b) receiving an uplink scheduling assignment for the uplink physical channel, comprising a resource allocation of a second set of frequency-domain resource blocks, where the second set comprises a subset of resource blocks not comprised in the first set, as well as an indication to apply the same precoding of the physical uplink channel as the precoding applied to the transmitted SRS; (c) applying a precoding of the physical uplink channel for each resource block comprised in both the first and second set using the precoder that was applied for precoding the SRS on the corresponding resource block; (d) for each resource block in the subset of resource blocks comprised in the second set but not in the first set, applying a precoding of the physical uplink channel using the precoder applied to the SRS on another resource block to form a precoded physical uplink channel; and (d) transmitting the precoded physical uplink channel. Further, in some embodiments, the other resource block is the resource block in the first set that minimizes the absolute distance in the resource block index from the resource block in the subset. In some embodiments, additionally the precoder used to precode the SRS on a first resource block is different from a precoder used to precode the SRS on a second resource block.

In some embodiments, a method is disclosed wherein a most recent precoder for a given PRB is used to transmit PUSCH when SRS is frequency hopped. In some embodiments, a method in a wireless device for transmitting an uplink physical channel comprises: (a) transmitting an SRS in a first time instant using a first precoder in a first set of subcarriers, the first set of subcarriers being comprised within a first resource group of subcarriers over which precoders are presumed to remain constant; (b) transmitting the SRS in a second time instant after the first time instant using a second precoder in a second set of subcarriers, the second set of subcarriers being comprised within a second resource group of subcarriers over which precoders are presumed to remain constant; and (c) transmitting a PUSCH occupying at least part of the first resource group and at least part of the second resource group, such that the gNB can assume that the first and second precoders are used to transmit the PUSCH on the first and second resource groups, respectively.

In some embodiments, a method of operation of a wireless device is disclosed in which frequency selective precoding is not used with SRI. In some embodiments, a method in a wireless device for transmitting an uplink physical channel comprises: (a) receiving signaling configuring the wireless device to receive an SRI; (b) expecting that the wireless device will not be configured with a PRG size that is less than the scheduled bandwidth or expecting that the wireless device will not be configured with a PRG size; and (c) receiving the SRI and transmitting the uplink physical channel according to the SRI.

In some embodiments, a method of operation of a wireless device is disclosed in which a wireless device that is configured with SRI but only supports non-coherent transmission does not support frequency selective transmission and/or precoded SRS. In some embodiments, a method in a wireless device for transmitting an uplink physical channel comprises: (a) indicating by the wireless device that it is only capable of non-coherent transmission; (b) receiving signaling that configures the wireless device to receive an SRI; (c) expecting in the wireless device that: the wireless device will not be configured with a PRG size less than the full scheduled bandwidth, the wireless device will not be configured with a PRG size, and/or the wireless device will not be configured to transmit precoded SRS; and (d) receiving the SRI and transmitting the uplink physical channel according to the SRI.

Certain embodiments may provide one or more of the following technical advantage(s). The UE will know how to determine a precoder for PUSCH for frequency bands outside the SRS frequency band when frequency selective SRS precoding is applied.

UEs configured with SRI but that only support noncoherent transmission can operate properly by not being configured to support frequency selective transmission and/or precoded SRS.

Some of the embodiments contemplated herein will now be described more fully with reference to the accompanying drawings. Other embodiments, however, are contained within the scope of the subject matter disclosed herein, and the disclosed subject matter should not be construed as limited to only the embodiments set forth herein; rather, these embodiments are provided by way of example to convey the scope of the subject matter to those skilled in the art.

Figure 2:
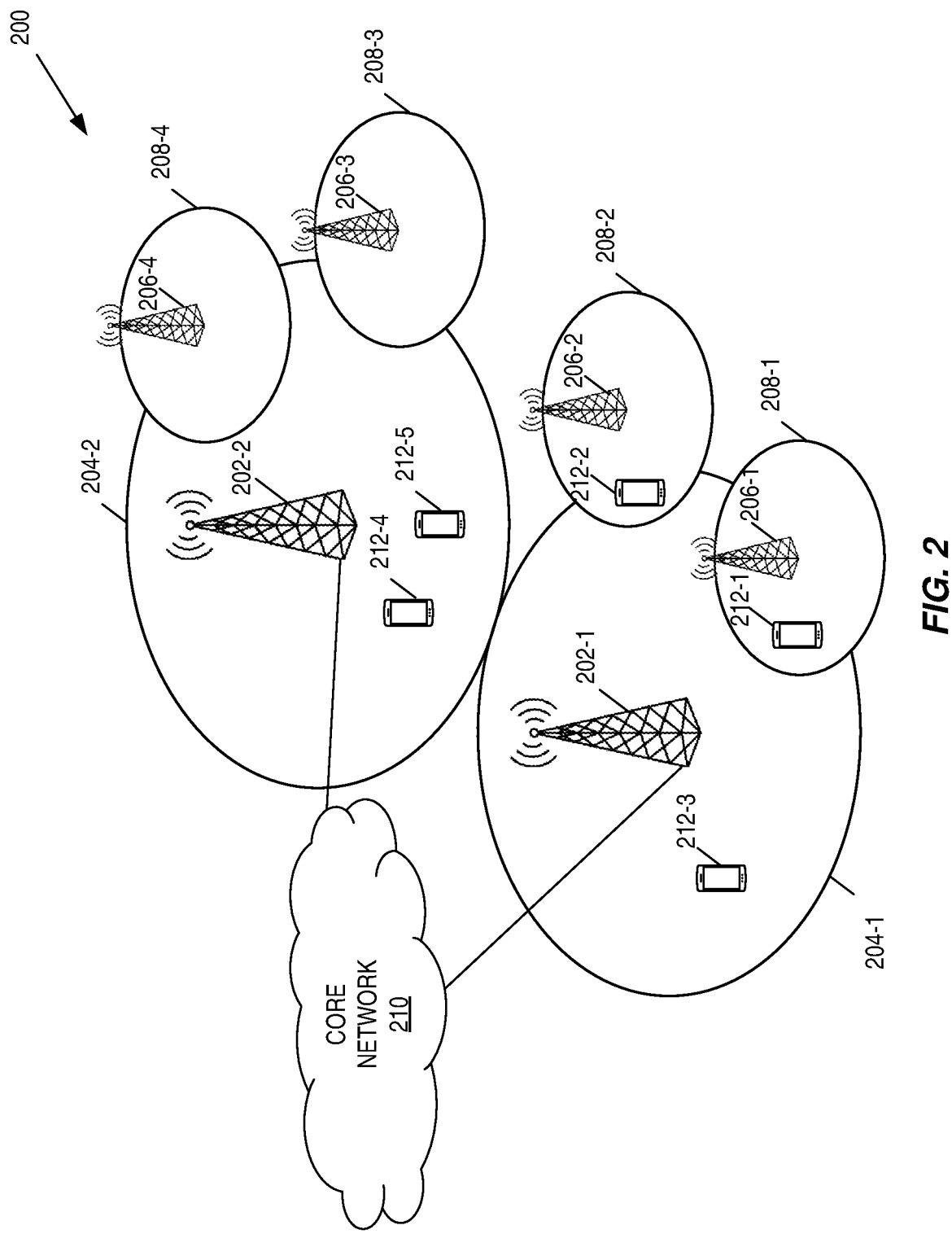
FIG. 2 illustrates one example of a cellular communications network according to some embodiments of the present disclosure.

FIG. 2 illustrates one example of a cellular communications network 200 according to some embodiments of the present disclosure. In the embodiments described herein, the cellular communications network 200 is 5G NR network. In this example, the cellular communications network 200 includes base stations 202-1 and 202-2, which in 5G NR are referred to as gNBs, controlling corresponding macro cells 204-1 and 204-2. The base stations 202-1 and 202-2 are generally referred to herein collectively as base stations 202 and individually as base station 202. Likewise, the macro cells 204-1 and 204-2 are generally referred to herein collectively as macro cells 204 and individually as macro cell 204. The cellular communications network 200 may also include a number of low power nodes 206-1 through 206-4 controlling corresponding small cells 208-1 through 208-4. The low power nodes 206-1 through 206-4 can be small base stations (such as pico or femto base stations) or Remote Radio Heads (RRHs), or the like. Notably, while not illustrated, one or more of the small cells 208-1 through 208-4 may alternatively be provided by the base stations 202. The low power nodes 206-1 through 206-4 are generally referred to herein collectively as low power nodes 206 and individually as low power node 206. Likewise, the small cells 208-1 through 208-4 are generally referred to herein collectively as small cells 208 and individually as small cell 208. The base stations 202 (and optionally the low power nodes 206) are connected to a core network 210.

The base stations 202 and the low power nodes 206 provide service to wireless devices 212-1 through 212-5 in the corresponding cells 204 and 208. The wireless devices 212-1 through 212-5 are generally referred to herein collectively as wireless devices 212 and individually as wireless device 212. The wireless devices 212 are also sometimes referred to herein as UEs.

In the proposed disclosure, it is assumed that a wireless device 212 (e.g., also referred to herein as UE 212) transmits one or more SRS resources which have been frequency-selectively precoded. That is, for each sub-band "s", a precoder $W_s$ is applied and at least for two of the sub-bands, $s_0$ and $s_1$, the corresponding precoders $W_{s_0}$ and $W_{s_1}$ are different, i.e. $W_{s_0} \neq W_{s_1}$. Generally, but not necessarily, the precoders may be different for all sub-bands. Each sub-band is comprised of a number of PRBs. In some embodiments, the sub-band size is equal to the SRS bandwidth definition granularity of four PRBs.

When the UE 212 is scheduled with a PUSCH transmission, the resource allocation indicates the PRBs on which the PUSCH is to be transmitted. Two types of resource allocations are available in NR, Type 0 and Type 1. With Type 0 resource allocation, a bitmap is signaled where each bit in the bitmap corresponds to a Resource Block Group (RBG) which comprises a number (2, 4, 8, or 16 depending on configuration) of contiguous PRBs. With Type 1 resource allocation, a contiguous number of PRBs are scheduled, which is indicated with a start PRB index and the allocation size in the number of PRBs. Regardless of how the scheduling resource allocation is conveyed, the UE 212 is informed which PRBs in the active Bandwidth (BW) Part (BWP) the PUSCH is to be transmitted on.

It is also assumed that the UE 212 receives an indication of one or more SRS resources (in the form of one or more SRI(s)) in the uplink grant, where the indicated SRS resources identify on which logical antenna ports $\{p_0, \ldots, p_{p-1}\}$ the PUSCH shall be transmitted on, according to the following formulation in 3GPP Technical Specification (TS) 38.211:

The block of vectors $[y^{(0)}(i) \ldots y^{(v-1)}(i)]^T$, $i=0, 1, \ldots, M_{symb}^{layer}-1$ shall be precoded according to $$\begin{bmatrix} z^{(p_0)}(i) \\ \vdots \\ z^{(p_{0-1})}(i) \end{bmatrix} = W \begin{bmatrix} y^{(0)}(i) \\ \vdots \\ y^{(v-1)}(i) \end{bmatrix}$$

where $i=0, 1, \ldots, M_{symb}^{ap}-1$, $M_{symb}^{ap}=M_{symb}^{layer}$. The set of antenna ports $\{p_0, \ldots, p_{p-1}\}$ shall be determined according to the procedure in TS 38.214.

For non-codebook-based transmission, the precoding matrix w equals the identity matrix.

For non-codebook based transmission, the antenna ports $\{p_0, \ldots, p_{p-1}\}$ are defined by how the SRSs have been transmitted; that is, what precoding $W_1, W_2, W_3, \ldots$ has been applied on the SRSs on each PRB. That is, if the PUSCH is mapped to set of logical SRS ports $\{p_0, \ldots, p_{p-1}\}$, the block of complex-valued vectors $$\begin{bmatrix} z^{(p_0)}(i) \\ \vdots \\ z^{(p_{0-1})}(i) \end{bmatrix} i = 0, 1, \ldots, M_{symb}^{ap} - 1$$

shall be precoded in the same fashion as the precoding of the indicated SRSs before being mapped to physical antennas. Note that in non-codebook based operation, since the gNB (i.e., the radio access node 202) does not signal the precoders $W_1, W_2, W_3, \ldots$ to the UE 212, the gNB is usually unaware of the precoding $W_1, W_2, W_3, \ldots$ used by the UE 212 on the SRS.

However, if the SRS resource has different frequency-occupancy than the PUSCH resource allocation, it is according to prior art methods undefined what precoding is to be applied to the PUSCH on the PRBs where the indicated SRS has not been transmitted. Furthermore, it is also undefined in the prior art for how long in time the UE 212 must maintain the same precoder after transmitting an SRS. For example, a UE 212 transmitting a frequency hopping SRS will transmit an SRS on a first set of PRBs in a first slot, and a second set of PRBs in a second slot. It is then undefined if the precoding used on the first set of PRBs would be used for transmission of PUSCH in the second slot. It is further undefined if precoding applied to SRS in the first slot can be assumed to be the same in the second slot.

The proposed disclosure comprises a rule for mapping the complex-valued vectors $$\begin{bmatrix} z^{(p_0)}(i) \\ \vdots \\ z^{(p_{0-i})}(i) \end{bmatrix}$$

onto the SRS antenna ports, and thus achieving frequency-selective PUSCH precoding.

Let $f_1, f_2, \ldots f_N$ be the set of PRB indices conveyed in the PUSCH resource allocation. For each scheduled PRB i=1, 2, ..., N, if the indicated SRS has been transmitted on the PRB $f_i$, the same precoding $W(f_i)$ as was used to precode the SRS on that PRB is used to precode the PUSCH on that PRB. Otherwise, if the indicated SRS has not been transmitted on the PRB $f_i$, the precoder $W(\tilde{f}_i)$ that was used to precode the SRS on another PRB $\tilde{f}_i$ is used to precode the PUSCH on the PRB $f_i$.

In one embodiment, the other PRB $\tilde{f}_i$ is selected using the following rule. Let the set of PRBs on which the SRS was transmitted be $\hat{f}_1, \hat{f}_2, \ldots, \hat{f}_M$, where M is the bandwidth of the transmitted SRS. The other PRB $\tilde{f}_i$ is selected as the PRB in $\hat{f}_1, \hat{f}_2, \ldots \hat{f}_M$ that minimizes the distance to the PRB $f_i$, that is, $$\tilde{f}_i = \min_{j=1,\ldots,M} |\hat{f}_j - f_i|.$$

Figure 3:
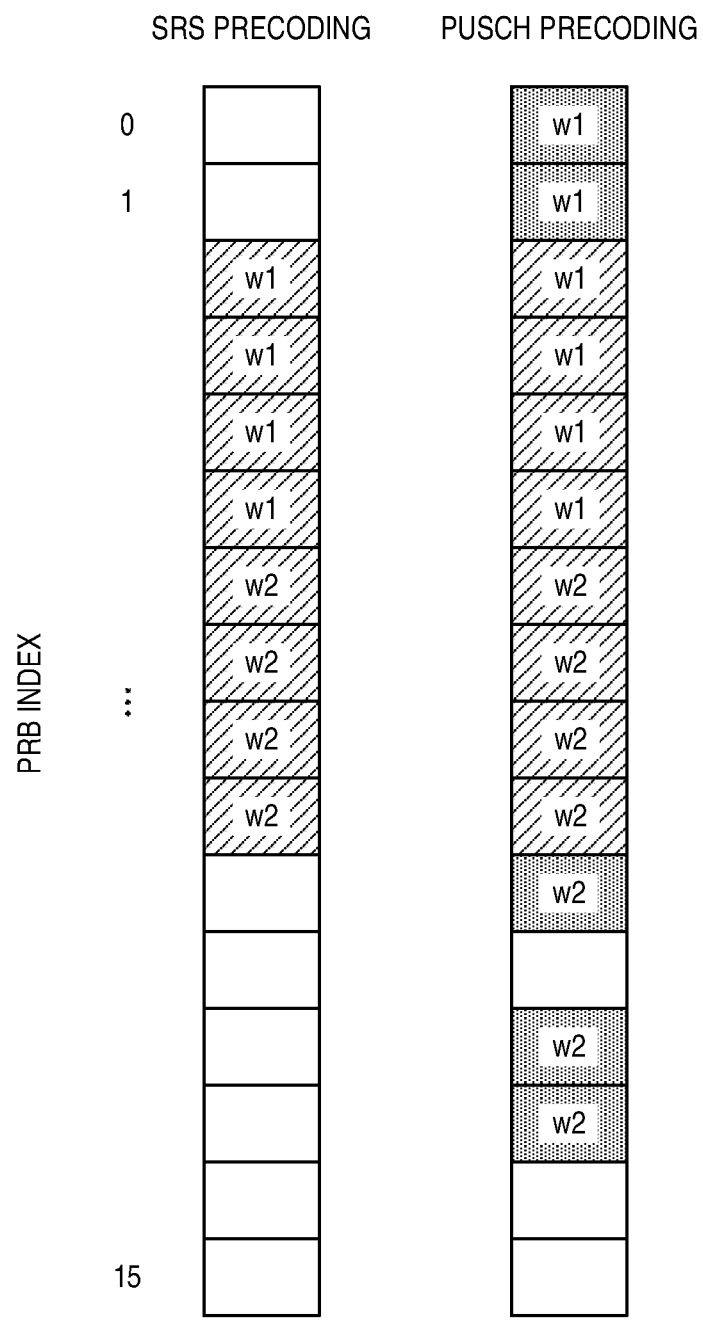
FIG. 3 illustrates an embodiment of the present disclosure in which Physical Uplink Shared Channel (PUSCH) precoding for Physical Resource Blocks (PRBs) that are outside of the occupied Sounding Reference Signal (SRS) bandwidth uses the same precoder as used for precoding SRS on the closest PRB within the occupied SRS bandwidth.

This embodiment is illustrated in FIG. 3.

In particular, FIG. 3 illustrates PUSCH precoding on PRBs where the indicated SRS resources have not been transmitted. As illustrated, frequency-selective SRS precoding is performed such that a first precoder (w1) is used to precode SRS for a first set of PRBs and a second precoder (w2) is used to precode SRS for a second set of PRBs. Then, with respect to PUSCH precoding, the PUSCH occupies some PRBs that are outside of the PRBs occupied by the SRS. For example, the PRBs with indices 0 and 1 are outside of the PRBs occupied by the SRS (which in this illustrated example are the PRBs with indices 2-9). In accordance with one embodiment, for PRBs 0 and 1, the first precoder (w1) used to precode SRS for the first set of PRBs is also used to precode PUSCH in PRBs 0 and 1. Likewise, on the other end of the PUSCH frequency band, PRBs 10, 12, and 13 are outside of the frequency band occupied by the SRS. In accordance with one embodiment, the second precoder (w2) used to precode SRS for the second set of PRBs is also used to precode PUSCH in PRBs 1, 12, and 13.

Figure 4:
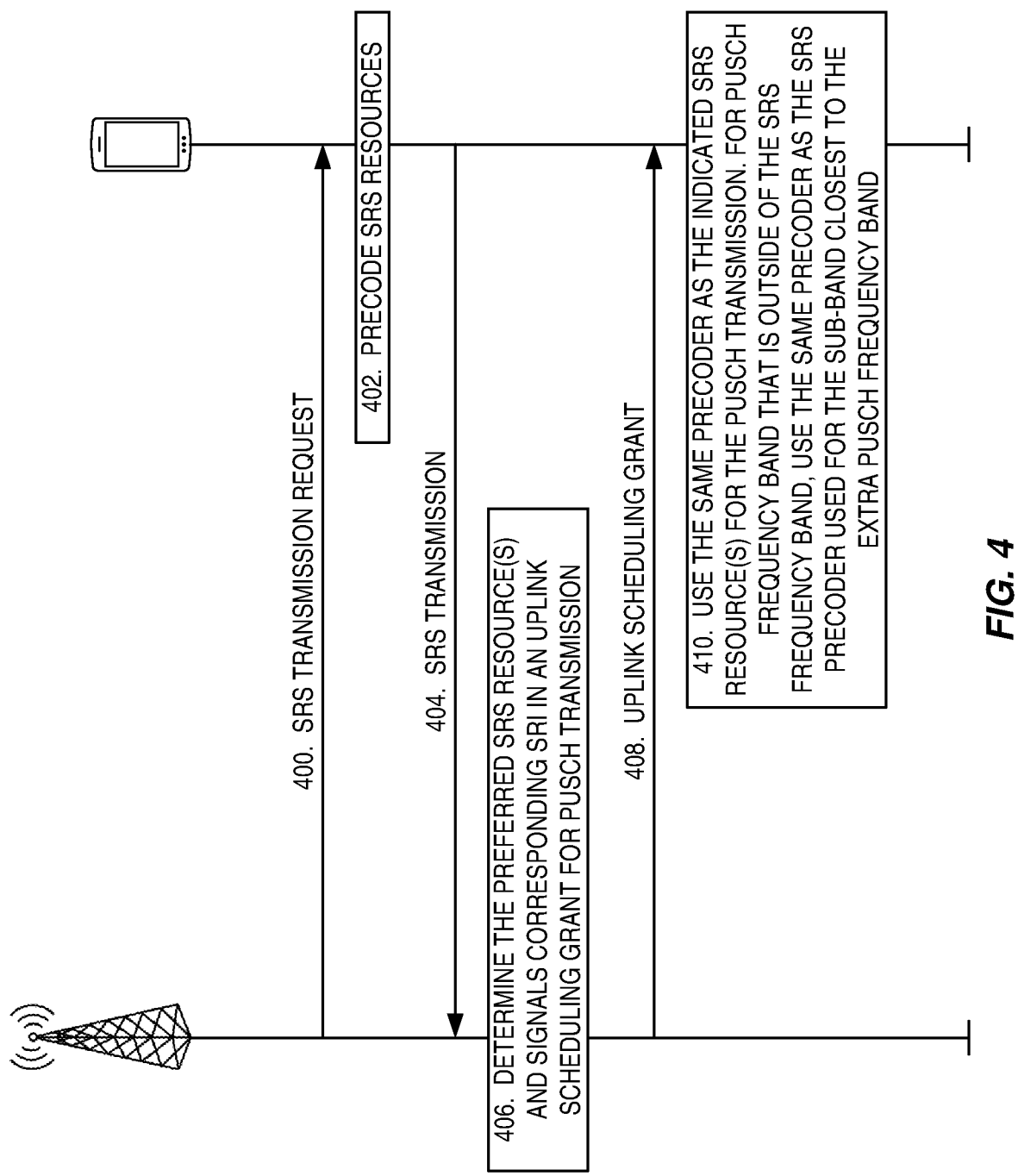
FIG. 4 illustrates an example embodiment of the present disclosure in which a User Equipment (UE) operates to perform PUSCH precoding in accordance with the embodiment of FIG. 3.

FIG. 4 illustrates another example embodiment of the proposed disclosure. In this example, it is assumed that the Transmit/Receive Point (TRP) (e.g., the radio access node 202) has selected SRS resource 1 (i.e., signaled SRI 1 to the UE) in an uplink grant for PUSCH transmission, which means that the UE 212 should apply the same precoder for the PUSCH transmission as was done for SRS resource 1. The SRS resource 1 has earlier been frequency selectively precoded with one precoder per PRG or sub-band, as illustrated in FIG. 3. The frequency band for the PUSCH transmission is larger than the frequency band of the SRS transmission, which means that the UE 212 does not know how to precode the PUSCH for these extra frequency bands. However, as can be seen in FIG. 3, the UE 212 applies the same precoder as was used for the PRB, PRG, or sub-band closest to the extra frequency band for the PUSCH transmission.

Specifically, as illustrated in FIG. 4, the radio access node 202 (e.g., TRP such as a gNB) sends an SRS transmission request to the wireless device 212 (step 400). Note that this process is equally applicable to the radio access node 206. The wireless device 212 precodes SRS resources and transmits the SRS, as described above (steps 402 and 404). The radio access node 202 determines the preferred SRS resource(s) and signals a corresponding SRI in an uplink scheduling grant for PUSCH transmission (steps 406 and 408). The wireless device 212 receives the uplink scheduling grant and uses the same precoder as the indicated SRS resource(s) for the PUSCH transmission (step 410). For PUSCH frequency-domain resources that are outside of the SRS frequency band, the wireless device 212 uses the same precoder used for the SRS in another frequency-domain resource such as, e.g., the same precoder used for the closest frequency-domain resource on which SRS was transmitted.

Figure 5:
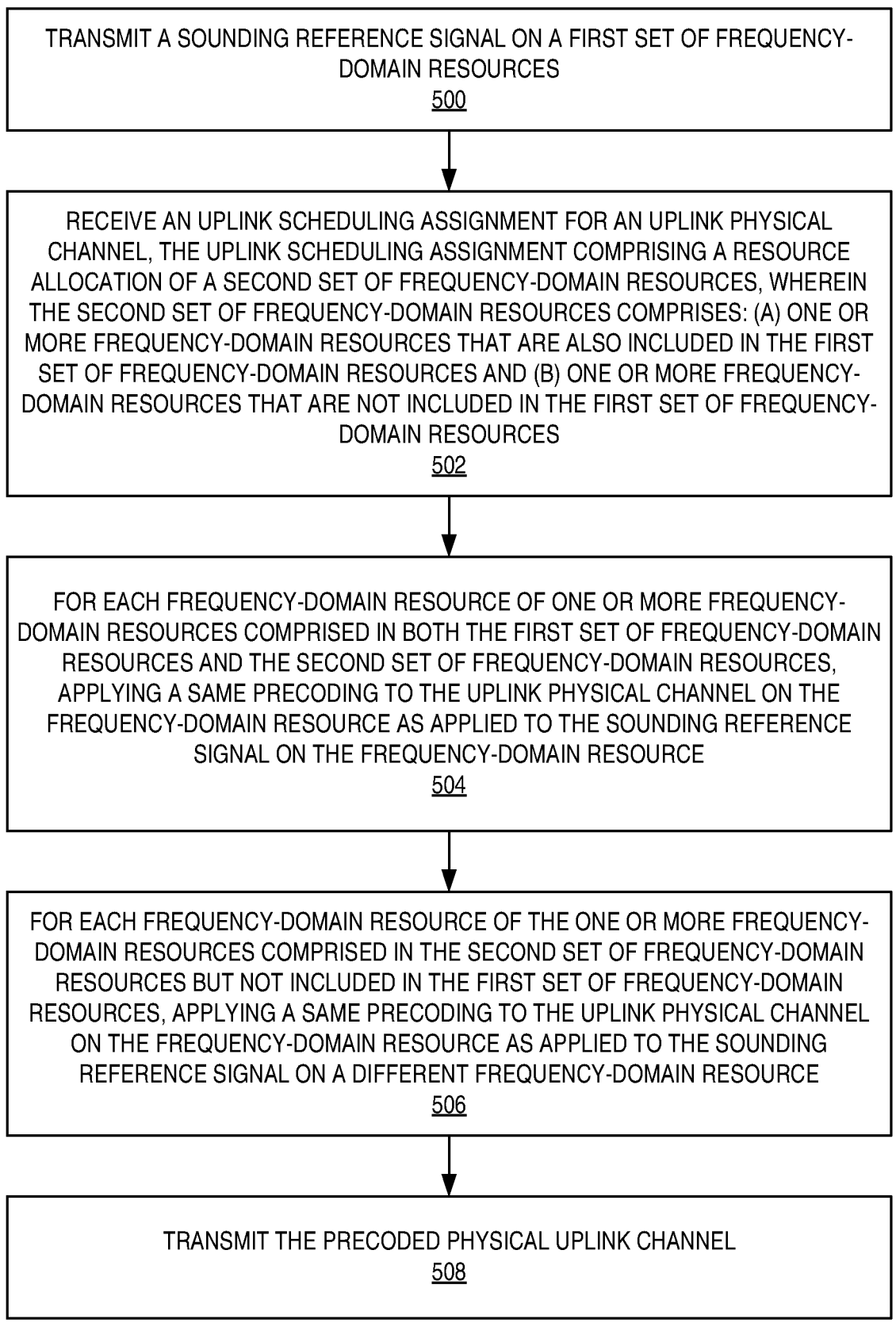
FIG. 5 is a flow chart that illustrates the operation of a wireless communication device (e.g., a UE) in accordance with some embodiments of the present disclosure.

FIG. 5 is a flow chart that illustrates the operation of the wireless device 212 in accordance with some embodiments of the present disclosure. The operation of the wireless device 212 here is one example of that described above with respect to FIGS. 3 and 4. As illustrated, the wireless device 212 transmits an SRS on a first set of frequency-domain resources (step 500). The wireless device 212 receives, from a radio access node 202 or 206, an uplink scheduling assignment for an uplink physical channel (e.g., PUSCH) (step 502). The uplink scheduling assignment comprises a resource allocation of a second set of frequency-domain resources, wherein the second set of frequency-domain resources comprises: (a) one or more frequency-domain resources that are also included in the first set of frequency-domain resources and (b) one or more frequency-domain resources that are not included in the first set of frequency-domain resources. In some embodiments, the uplink scheduling assignment further comprises an indication to apply the same precoding to the physical uplink channel as applied to the transmitted SRS.

In order to form a precoded uplink channel, the wireless device 212 performs steps 504 and 506. In particular, for each frequency-domain resource of one or more frequency-domain resources comprised in both the first set of frequency-domain resources and the second set of frequency-domain resources, the wireless device 212 applies a same precoding to the uplink physical channel on the frequency-domain resource as applied to the SRS on the frequency-domain resource (step 504). For each frequency-domain resource of the one or more frequency-domain resources comprised in the second set of frequency-domain resources but not included in the first set of frequency-domain resources, the wireless device 212 applies a same precoding to the uplink physical channel on the frequency-domain resource as applied to the SRS on a different frequency-domain resource (step 506). The wireless device 212 transmits the precoded physical uplink channel (step 508).

In some embodiments, in step 506, for each frequency-domain resource of the one or more frequency-domain resources comprised in the second set of frequency-domain resources but not included in the first set of frequency-domain resources, the wireless device 212 applies the same precoding to the uplink physical channel on the frequency-domain resource as applied to the SRS on another frequency-domain resource that is: (a) in the first set of frequency-domain resources and (b) minimizes an absolute distance in resource index from the frequency-domain resource.

In some embodiments, the precoding applied to the SRS on a first frequency-domain resource in the first set of frequency-domain resources is different than the precoding applied to the SRS on a second frequency-domain resource in the first set of frequency-domain resources.

In another embodiment, a UE 212 transmits a frequency hopping SRS, where the SRS occupies a different set of contiguous PRBs in transmissions of the SRS at different times (such as in different OFDM symbols, slots, and/or subframes). The UE 212 is assumed to use the same precoding on the PUSCH as it uses for the SRS. The UE 212 may only change the precoder used on the PRBs for PUSCH when it transmits an SRS that occupies the PRBs, a PRG, and/or a sub-band on the PRBs used for the PUSCH. In this way, when the SRS is transmitted enough times such that it hops over the entire set of PRBs allocated by PUSCH, the gNB (e.g., the radio access node 202) can have a complete measurement of the SRS including the precoding used by the UE 212. Therefore, in one embodiment, the gNB can assume that the precoder a UE 212 uses across all PRBs in a PRG of an SRS resource when that SRS resource does not occupy the PRG is the precoder used when the SRS resource was last transmitted on the PRG.

Figure 6:
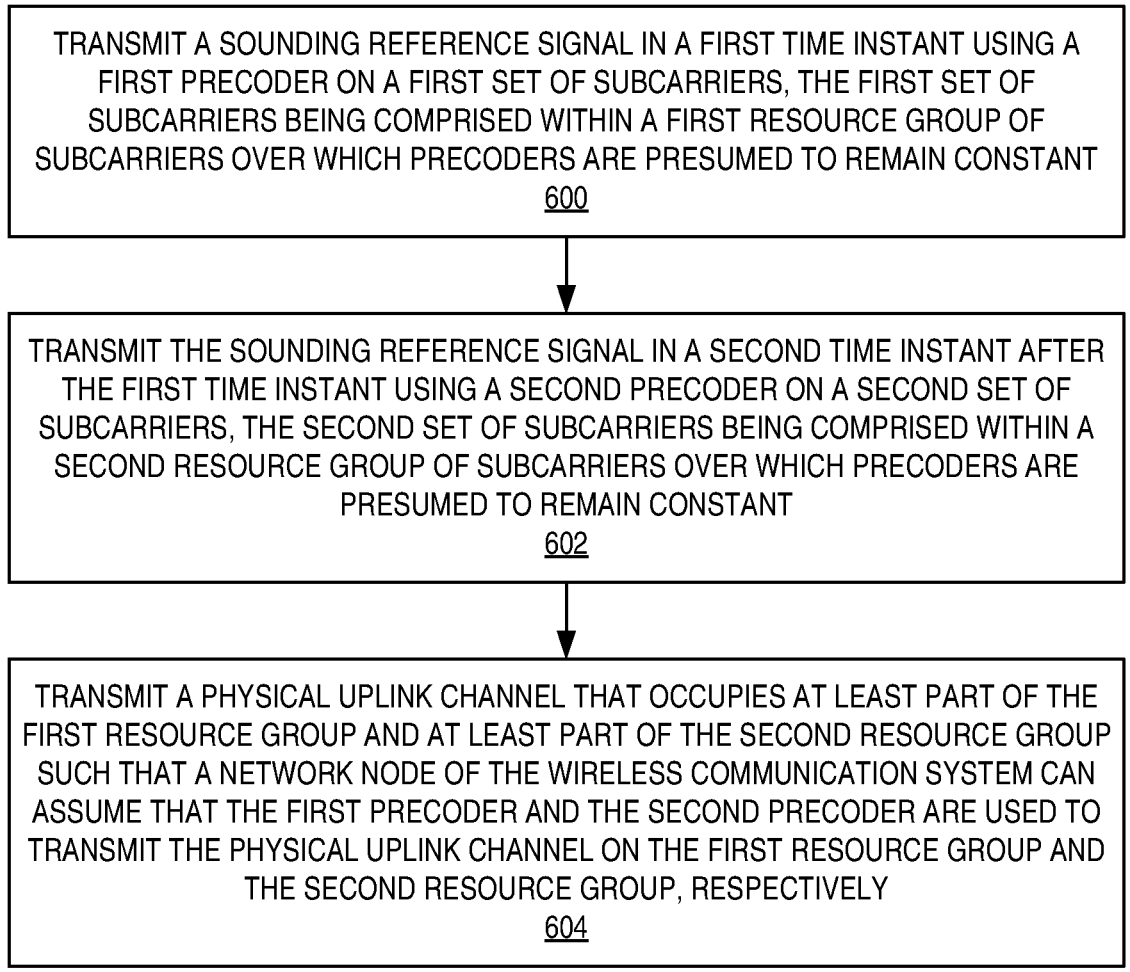
FIG. 6 is a flow chart that illustrates the operation of a wireless communication device to transmit a physical uplink channel where the wireless device transmits a frequency hopping SRS in accordance with some embodiments of the present disclosure.

In this regard, FIG. 6 is a flow chart that illustrates the operation of a wireless device 212 to transmit a physical uplink channel where the wireless device 212 transmits a frequency hopping SRS in accordance with some embodiments of the present disclosure. This process is one example of the embodiment described in the previous paragraph. As illustrated, the wireless device 212 transmits an SRS in a first time instant using a first precoder on a first set of subcarriers, the first set of subcarriers being comprised within a first resource group of subcarriers over which precoders are presumed to remain constant (step 600). The wireless device 212 transmits the SRS in a second time instant after the first time instant using a second precoder on a second set of subcarriers, the second set of subcarriers being comprised within a second resource group of subcarriers over which precoders are presumed to remain constant (step 602). The wireless device 212 transmits a physical uplink channel that occupies at least part of the first resource group and at least part of the second resource group such that a network node of the wireless communication system can assume that the first precoder and the second precoder are used to transmit the physical uplink channel on the first resource group and the second resource group, respectively (step 604). For example, the wireless device 212 may transmit the physical uplink channel such that the first precoder is applied to the portion in the first resource group and the second precoder is applied to the portion in the second resource group.

In cases where only wideband SRI is supported, it is not possible to select SRS resources frequency selectively. This tends to reduce the benefit of frequency selective precoding. Furthermore, in some scenarios, such as when there is little frequency selective fading, frequency selectively precoded PUSCH transmission may not provide significant performance benefits over wideband precoded PUSCH transmission. Therefore, in some implementations, it may be sufficient for the UE to use a single precoder over the entire scheduled PUSCH bandwidth when SRI and/or precoded SRS are configured. Therefore, in an embodiment, a UE configured with SRI does not expect to be configured with a PRG size that is less than the scheduled bandwidth, or alternatively does not expect to be configured with a PRG size.

Figure 7:
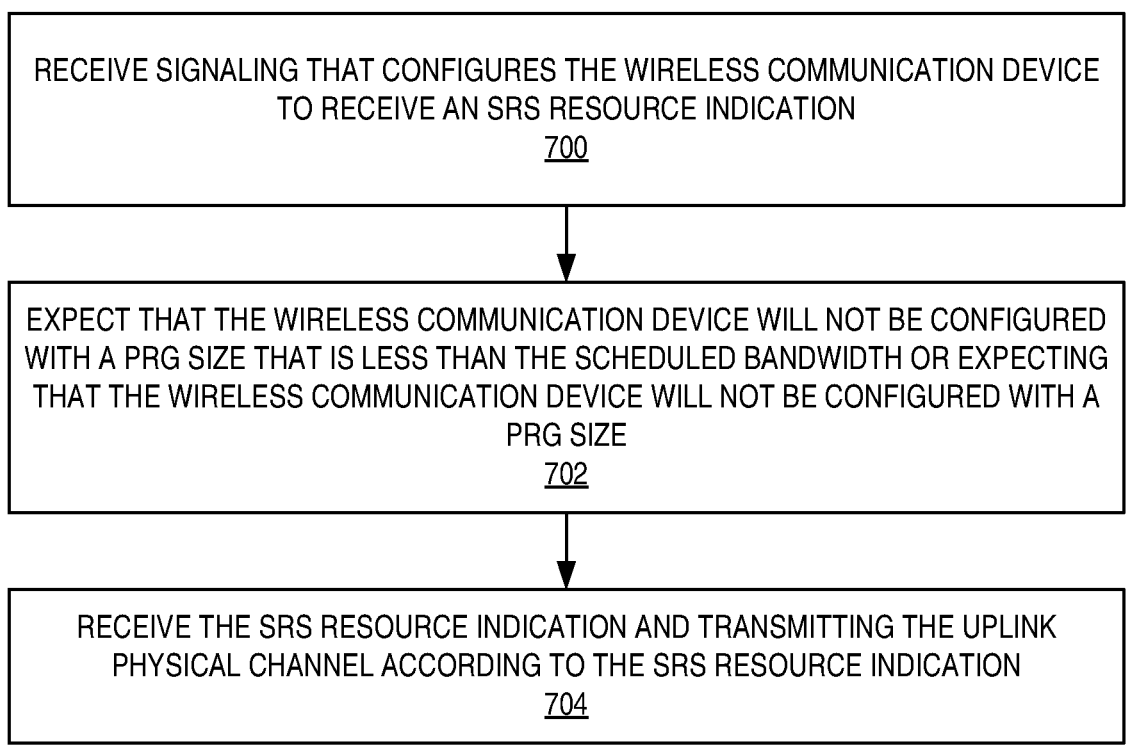
FIG. 7 is a flow chart that illustrates the operation of a wireless communication device to transmit a physical uplink channel where only wideband SRS Resource Indicator (SRI) is supported in accordance with some embodiments of the present disclosure.

In this regard, FIG. 7 is a flow chart that illustrates the operation of a wireless device 212 to transmit a physical uplink channel where only wideband SRI is supported in accordance with some embodiments of the present disclosure. This process is one example of the embodiment described in the previous paragraph. As illustrated, the wireless device 212 receives signaling that configures the wireless device 212 to receive an SRS resource indication (step 700). The wireless device 212 expects that the wireless device 212 will not be configured with a PRG size that is less than the scheduled bandwidth or expects that the wireless device 212 will not be configured with a PRG size (step 702). The wireless device 212 receives the SRS resource indication and transmits the uplink physical channel according to the SRS resource indication (step 704). As a result of the expectation in step 702, if, e.g., the wireless device 212 were to receive a signaling attempting to configure the wireless device 212 with a PRG size that is not less than the scheduled bandwidth or signaling attempting to configure the wireless device 212 with a PRG size, the wireless device 212 can, e.g., ignore this configuration.

In some embodiments, a UE capable of non-codebook based transmission may only be capable of non-coherent transmission. In this case, the UE may still transmit multiple spatial layers using different antennas, where each layer is carried on only one antenna. Such UEs could further select an antenna for each of the spatial layers they transmit. However, in order to precode a given spatial layer, a UE would need to control the relative phase of multiple antennas carrying that spatial layer, which UEs only capable of non-coherent transmission can't do. Since precoded SRSs are used for channel estimation for the spatial layers of non-codebook based transmission, such a 'non-coherent only' capable UE may not be capable of precoded SRS transmission. Furthermore, since a PRG size requires that a UE should be able to support frequency selective precoding, a UE only capable of non-coherent transmission may not be able to be configured with a PRG size of less than the full scheduled bandwidth. Therefore, in an embodiment, a UE that is configured with SRI but that indicates it is only capable of non-coherent transmission does not expect to be configured with a PRG size less than the full scheduled bandwidth, or alternatively to be configured with a PRG size. In a similar embodiment, a UE that is configured with SRI that indicates it is only capable of non-coherent transmission does not expect to be configured to transmit precoded SRS.

Figure 8:
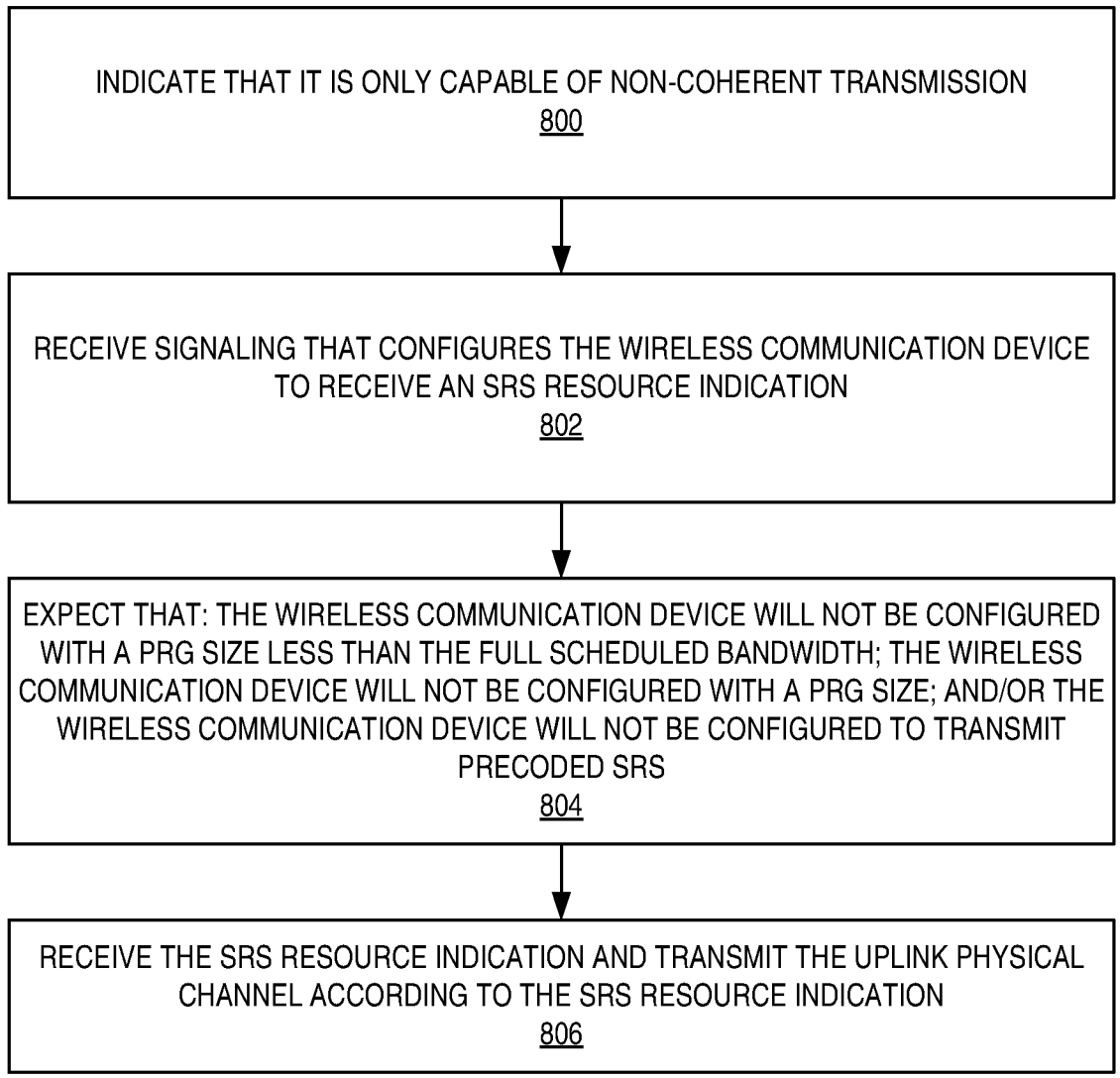
FIG. 8 is a flow chart that illustrates the operation of a wireless communication device to transmit a physical uplink channel where the wireless device only supports non-coherent transmission in accordance with some embodiments of the present disclosure.

In this regard, FIG. 8 is a flow chart that illustrates the operation of a wireless device 212 to transmit a physical uplink channel where the wireless device 212 only supports non-coherent transmission in accordance with some embodiments of the present disclosure. This process is one example of the embodiments described in the previous paragraph. As illustrated, the wireless device 212 indicates (e.g., to a network node such as a radio access node 202 or 206) that it is only capable of non-coherent transmission (step 800). The wireless device 212 receives signaling that configures the wireless device 212 to receive an SRS resource indication (step 802). The wireless device 212 expects that: the wireless device 212 will not be configured with a PRG size less than the full scheduled bandwidth; the wireless device 212 will not be configured with a PRG size; and/or the wireless device 212 will not be configured to transmit precoded SRS (step 804). The wireless device 212 receives the SRS resource indication and transmits the uplink physical channel according to the SRS resource indication (step 806). As a result of the expectation in step 804, if, e.g., the wireless device 212 were to receive a signaling attempting to configure the wireless device 212 with a PRG size that is not less than the scheduled bandwidth or signaling attempting to configure the wireless device 212 with a PRG size, the wireless device 212 can, e.g., ignore this configuration.

Figure 9:
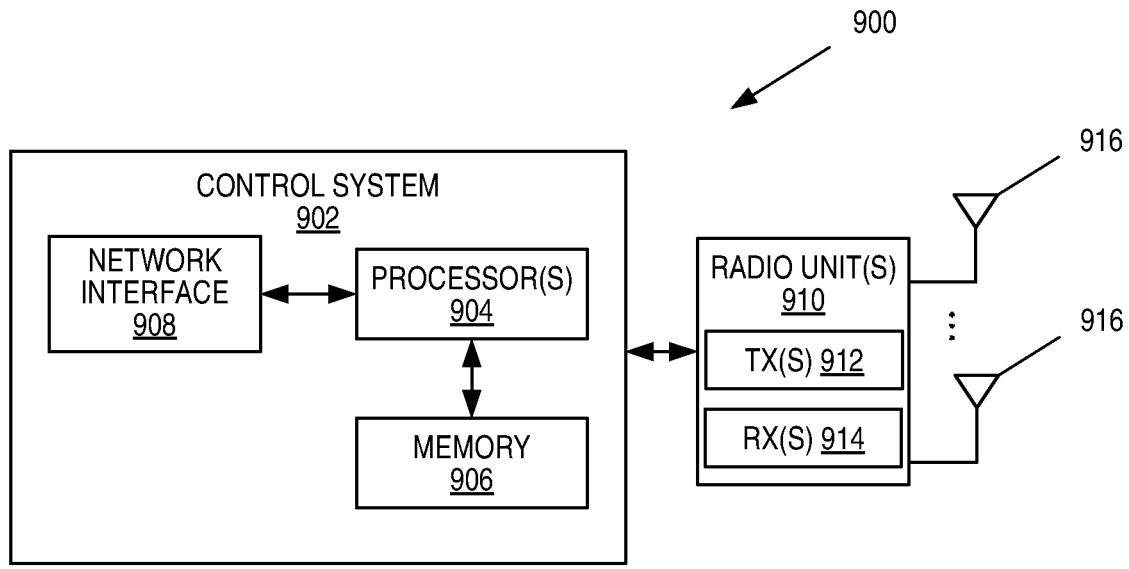
FIGS. 9 through 11 are schematic block diagrams of a radio access node according to some embodiments of the present disclosure.
Figure 10:
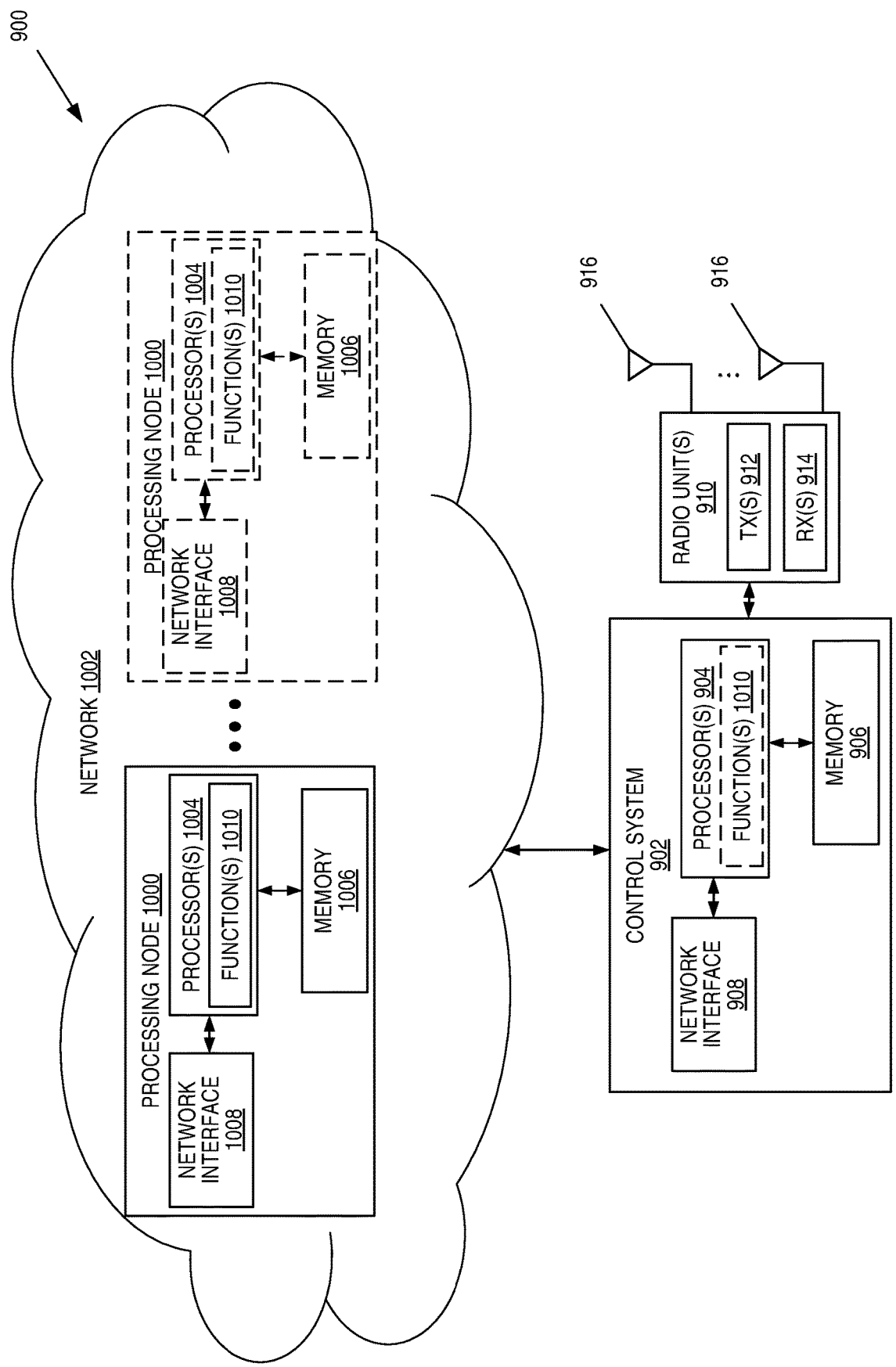

FIG. 9 is a schematic block diagram of a radio access node 900 according to some embodiments of the present disclosure. The radio access node 900 may be, for example, radio access node 202 or 206. As illustrated, the radio access node 900 includes a control system 902 that includes one or more processors 904 (e.g., Central Processing Units (CPUs), Application Specific Integrated Circuits (ASICs), Field Programmable Gate Arrays (FPGAs), and/or the like), memory 906, and a network interface 908. In addition, the radio access node 900 includes one or more radio units 910 that each includes one or more transmitters 912 and one or more receivers 914 coupled to one or more antennas 916. In some embodiments, the radio unit(s) 910 is external to the control system 902 and connected to the control system 902 via, e.g., a wired connection (e.g., an optical cable). However, in some other embodiments, the radio unit(s) 910 and potentially the antenna(s) 916 are integrated together with the control system 902. The one or more processors 904 operate to provide one or more functions of a radio access node 900 as described herein. In some embodiments, the function(s) are implemented in software that is stored, e.g., in the memory 906 and executed by the one or more processors 904:

FIG. 10 is a schematic block diagram that illustrates a virtualized embodiment of the radio access node 900 according to some embodiments of the present disclosure. This discussion is equally applicable to other types of network nodes. Further, other types of network nodes may have similar virtualized architectures.

As used herein, a "virtualized" radio access node is an implementation of the radio access node 900 in which at least a portion of the functionality of the radio access node 900 is implemented as a virtual component(s) (e.g., via a virtual machine(s) executing on a physical processing node(s) in a network(s)). As illustrated, in this example, the radio access node 900 includes the control system 902 that includes the one or more processors 904 (e.g., CPUs, ASICs, FPGAs, and/or the like), the memory 906, and the network interface 908 and the one or more radio units 910 that each includes the one or more transmitters 912 and the one or more receivers 914 coupled to the one or more antennas 916, as described above. The control system 902 is connected to the radio unit(s) 910 via, for example, an optical cable, or the like. The control system 902 is connected to one or more processing nodes 1000 coupled to or included as part of a network(s) 1002 via the network interface 908. Each processing node 1000 includes one or more processors 1004 (e.g., CPUs, ASICs, FPGAs, and/or the like), memory 1006, and a network interface 1008.

In this example, functions 1010 of the radio access node 900 described herein are implemented at the one or more processing nodes 1000 or distributed across the control system 902 and the one or more processing nodes 1000 in any desired manner. In some particular embodiments, some or all of the functions 1010 of the radio access node 900 described herein are implemented as virtual components executed by one or more virtual machines implemented in a virtual environment(s) hosted by the processing node(s) 1000. As will be appreciated by one of ordinary skill in the art, additional signaling or communication between the processing node(s) 1000 and the control system 902 is used in order to carry out at least some of the desired functions 1010. Notably, in some embodiments, the control system 902 may not be included, in which case the radio unit(s) 910 communicate directly with the processing node(s) 1000 via an appropriate network interface(s).

In some embodiments, a computer program including instructions which, when executed by at least one processor, causes the at least one processor to carry out the functionality of radio access node 900 or a node (e.g., a processing node 1000) implementing one or more of the functions 1010 of the radio access node 900 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 11:
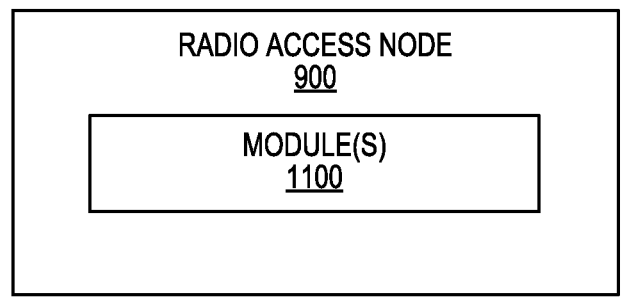

FIG. 11 is a schematic block diagram of the radio access node 900 according to some other embodiments of the present disclosure. The radio access node 900 includes one or more modules 1100, each of which is implemented in software. The module(s) 1100 provide the functionality of the radio access node 900 described herein. This discussion is equally applicable to the processing node 1000 of FIG. 10 where the modules 1100 may be implemented at one of the processing nodes 1000 or distributed across multiple processing nodes 1000 and/or distributed across the processing node(s) 1000 and the control system 902.

Figure 12:
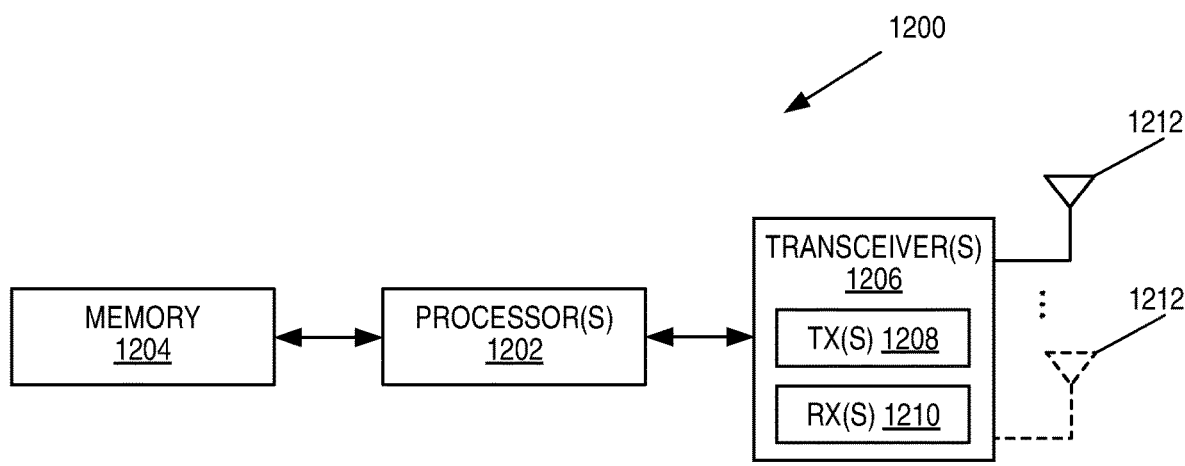
FIGS. 12 and 13 are schematic block diagrams of a wireless communication device (e.g., a UE) according to some embodiments of the present disclosure.

FIG. 12 is a schematic block diagram of a UE 1200 according to some embodiments of the present disclosure. As illustrated, the UE 1200 includes one or more processors 1202 (e.g., CPUs, ASICs, FPGAs, and/or the like), memory 1204, and one or more transceivers 1206 each including one or more transmitters 1208 and one or more receivers 1210 coupled to one or more antennas 1212. In some embodiments, the functionality of the UE 1200 described above may be fully or partially implemented in software that is, e.g., stored in the memory 1204 and executed by the processor(s) 1202.

In some embodiments, a computer program including instructions which, when executed by at least one processor, causes the at least one processor to carry out the functionality of the UE 1200 according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 13:
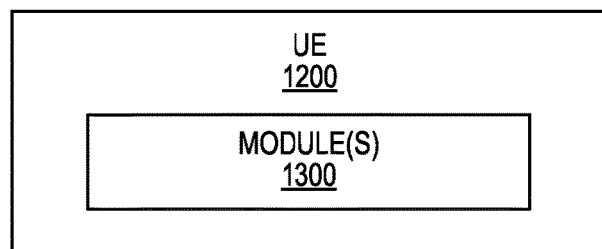

FIG. 13 is a schematic block diagram of the UE 1200 according to some other embodiments of the present disclosure. The UE 1200 includes one or more modules 1300, each of which is implemented in software. The module(s) 1300 provide the functionality of the UE 1200 described herein.

While processes in the figures may show a particular order of operations performed by certain embodiments of the invention, it should be understood that such order is exemplary (e.g., alternative embodiments may perform the operations in a different order, combine certain operations, overlap certain operations, etc.).

Figure 14:
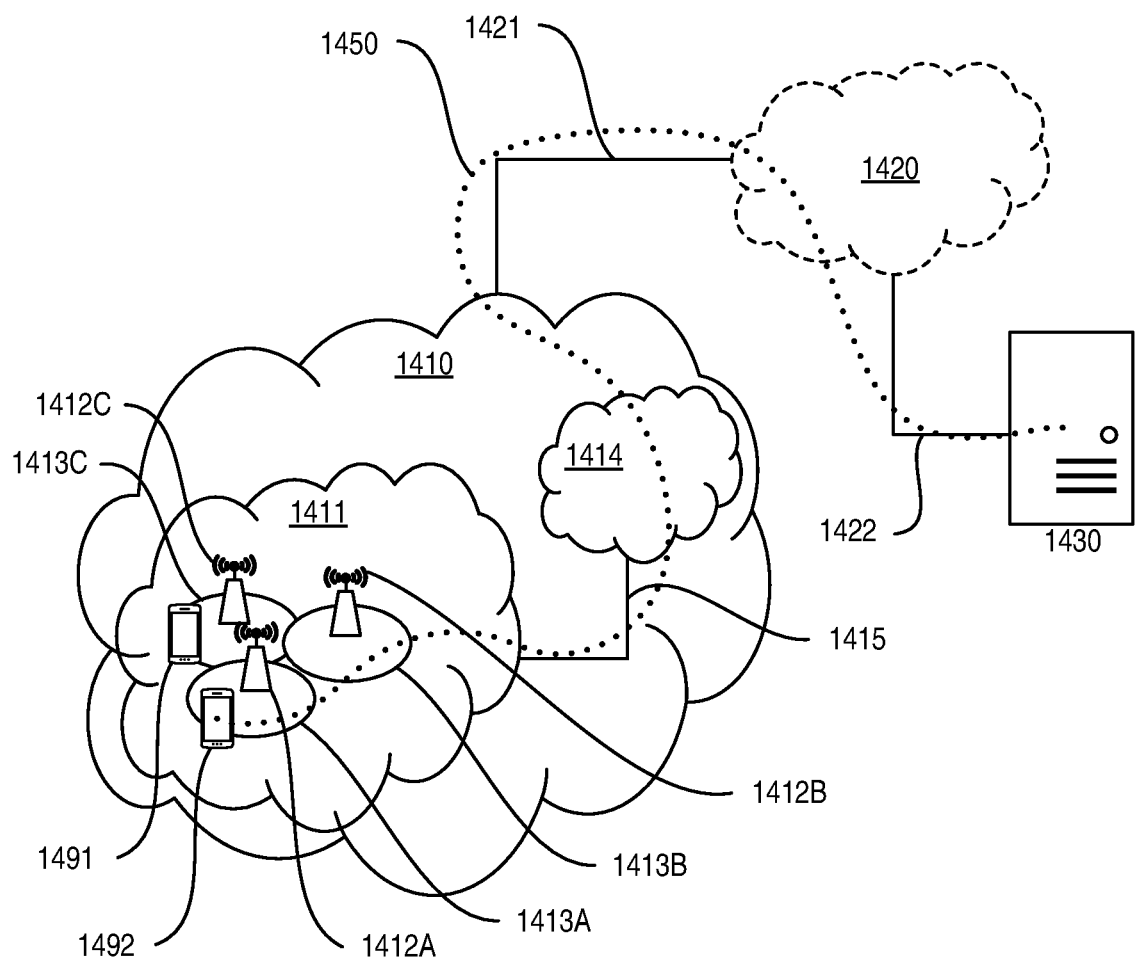
FIG. 14 illustrates a communication system in accordance with some embodiments of the present disclosure.

With reference to FIG. 14, in accordance with an embodiment, a communication system includes a telecommunication network 1410, such as a 3GPP-type cellular network, which comprises an access network 1411, such as a Radio Access Network (RAN), and a core network 1414. The access network 1411 comprises a plurality of base stations 1412A, 1412B, 1412C, such as Node Bs, eNBs, gNBs, or other types of wireless Access Points (APs), each defining a corresponding coverage area 1413A, 1413B, 1413C. Each base station 1412A, 1412B, 1412C is connectable to the core network 1414 over a wired or wireless connection 1415. A first UE 1491'located in coverage area 1413C is configured to wirelessly connect to, or be paged by, the corresponding base station 1412C. A second UE 1492 in coverage area 1413A is wirelessly connectable to the corresponding base station 1412A. While a plurality of UEs 1491, 1492 are illustrated in this example, the disclosed embodiments are equally applicable to a situation where a sole UE is in the coverage area or where a sole UE is connecting to the corresponding base station 1412.

The telecommunication network 1410 is itself connected to a host computer 1430, which may be embodied in the hardware and/or software of a standalone server, a cloud-implemented server, a distributed server, or as processing resources in a server farm. The host computer 1430 may be under the ownership or control of a service provider, or may be operated by the service provider or on behalf of the service provider. Connections 1421 and 1422 between telecommunication network 1410 and the host computer 1430 may extend directly from the core network 1414 to the host computer 1430 or may go via an optional intermediate network 1420. The intermediate network 1420 may be one of, or a combination of more than one of, a public, private, or hosted network; the intermediate network 1420, if any, may be a backbone network or the Internet; in particular, the intermediate network 1420 may comprise two or more sub-networks (not shown).

The communication system of FIG. 14 as a whole enables connectivity between the connected UEs 1491, 1492 and the host computer 1430. The connectivity may be described as an Over-the-Top (OTT) connection 1450. The host computer 1430 and the connected UEs 1491, 1492 are configured to communicate data and/or signaling via the OTT connection 1450, using the access network 1411, the core network 1414, any intermediate network 1420, and possible further infrastructure (not shown) as intermediaries. The OTT connection 1450 may be transparent in the sense that the participating communication devices through which the OTT connection 1450 passes are unaware of routing of uplink and downlink communications. For example, the base station 1412 may not or need not be informed about the past routing of an incoming downlink communication with data originating from the host computer 1430 to be forwarded (e.g., handed over) to a connected UE 1491. Similarly, the base station 1412 need not be aware of the future routing of an outgoing uplink communication originating from the UE 1491 towards the host computer 1430.

Example implementations, in accordance with an embodiment, of the UE, base station, and host computer discussed in the preceding paragraphs will now be described with reference to FIG. 15. In a communication system 1500, a host computer 1510 comprises hardware 1515 including a communication interface 1516 configured to set up and maintain a wired or wireless connection with an interface of a different communication device of the communication system 1500. The host computer 1510 further comprises processing circuitry 1518, which may have storage and/or processing capabilities. In particular, the processing circuitry 1518 may comprise one or more programmable processors, ASICs, FPGAs, or combinations of these (not shown) adapted to execute instructions. The host computer 1510 further comprises software 1511, which is stored in or accessible by the host computer 1510 and executable by the processing circuitry 1518. The software 1511 includes a host application 1512. The host application 1512 may be operable to provide a service to a remote user, such as a UE 1530 connecting via an OTT connection 1550 terminating at the UE 1530 and the host computer 1510. In providing the service to the remote user, the host application 1512 may provide user data which is transmitted using the OTT connection 1550.

The communication system 1500 further includes a base station 1520 provided in a telecommunication system and comprising hardware 1525 enabling it to communicate with the host computer 1510 and with the UE 1530. The hardware 1525 may include a communication interface 1526 for setting up and maintaining a wired or wireless connection with an interface of a different communication device of the communication system 1500, as well as a radio interface 1527 for setting up and maintaining at least a wireless connection 1570 with the UE 1530 located in a coverage area (not shown in FIG. 15) served by the base station 1520. The communication interface 1526 may be configured to facilitate a connection 1560 to the host computer 1510. The connection 1560 may be direct or it may pass through a core network (not shown in FIG. 15) of the telecommunication system and/or through one or more intermediate networks outside the telecommunication system. In the embodiment shown, the hardware 1525 of the base station 1520 further includes processing circuitry 1528, which may comprise one or more programmable processors, ASICs, FPGAs, or combinations of these (not shown) adapted to execute instructions. The base station 1520 further has software 1521 stored internally or accessible via an external connection.

The communication system 1500 further includes the UE 1530 already referred to. The UE's 1530 hardware 1535 may include a radio interface 1537 configured to set up and maintain a wireless connection 1570 with a base station serving a coverage area in which the UE 1530 is currently located. The hardware 1535 of the UE 1530 further includes processing circuitry 1538, which may comprise one or more programmable processors, ASICs, FPGAs, or combinations of these (not shown) adapted to execute instructions. The UE 1530 further comprises software 1531, which is stored in or accessible by the UE 1530 and executable by the processing circuitry 1538. The software 1531 includes a client application 1532. The client application 1532 may be operable to provide a service to a human or non-human user via the UE 1530, with the support of the host computer 1510. In the host computer 1510, the executing host application 1512 may communicate with the executing client application 1532 via the OTT connection 1550 terminating at the UE 1530 and the host computer 1510. In providing the service to the user, the client application 1532 may receive request data from the host application 1512 and provide user data in response to the request data. The OTT connection 1550 may transfer both the request data and the user data. The client application 1532 may interact with the user to generate the user data that it provides.

Figure 15:
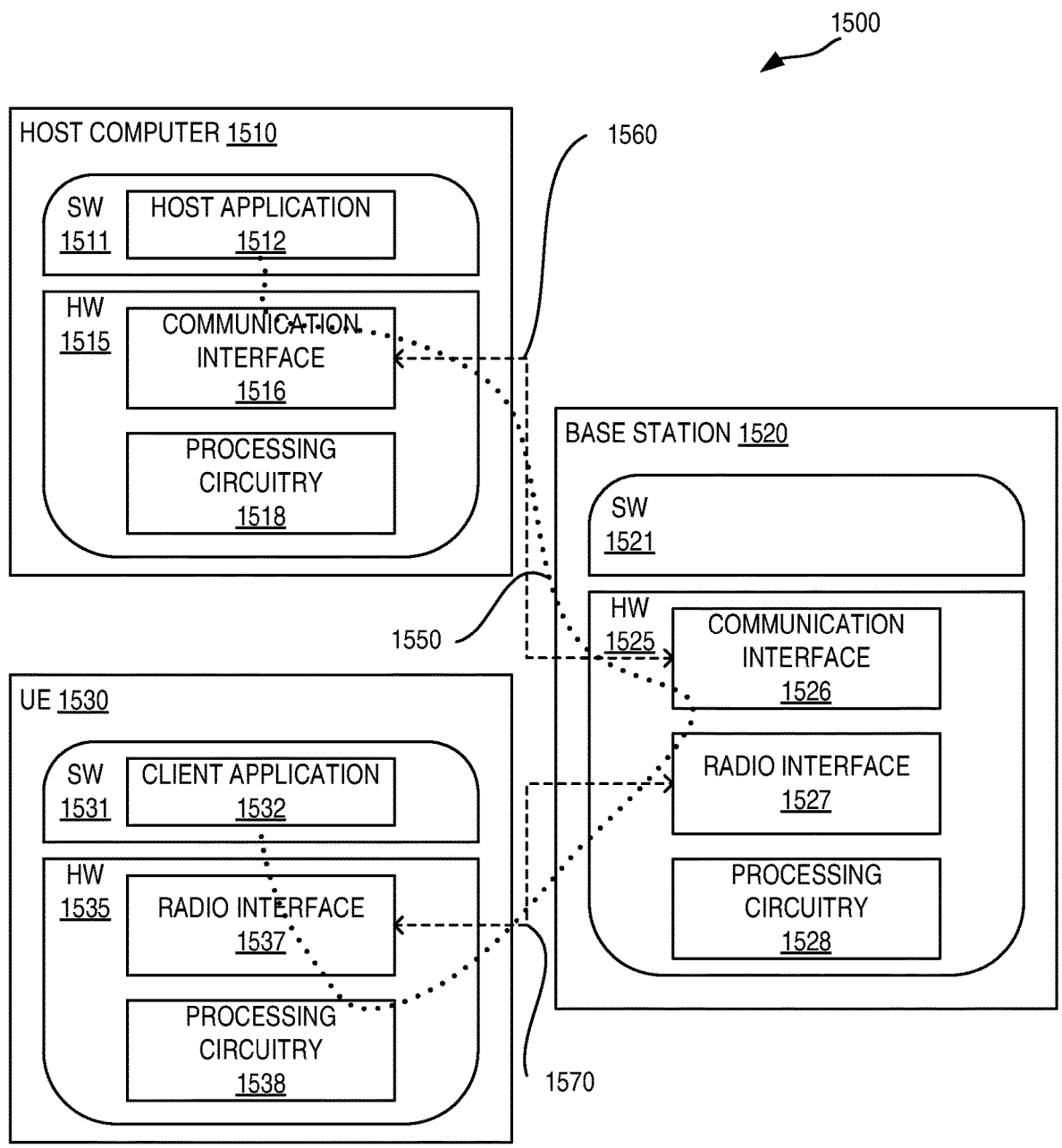
FIG. 15 illustrates a host computer, a base station, and a UE in accordance with some embodiments of the present disclosure.

It is noted that the host computer 1510, the base station 1520, and the UE 1530 illustrated in FIG. 15 may be similar or identical to the host computer 1430, one of the base stations 1412A, 1412B, 1412C, and one of the UEs 1491, 1492 of FIG. 14, respectively. This is to say, the inner workings of these entities may be as shown in FIG. 15 and independently, the surrounding network topology may be that of FIG. 14.

In FIG. 15, the OTT connection 1550 has been drawn abstractly to illustrate the communication between the host computer 1510 and the UE 1530 via the base station 1520 without explicit reference to any intermediary devices and the precise routing of messages via these devices. The network infrastructure may determine the routing, which may be configured to hide from the UE 1530 or from the service provider operating the host computer 1510, or both. While the OTT connection 1550 is active, the network infrastructure may further take decisions by which it dynamically changes the routing (e.g., on the basis of load balancing consideration or reconfiguration of the network).

The wireless connection 1570 between the UE 1530 and the base station 1520 is in accordance with the teachings of the embodiments described throughout this disclosure. One or more of the various embodiments improve the performance of OTT services provided to the UE 1530 using the OTT connection 1550, in which the wireless connection 1570 forms the last segment. More precisely, the teachings of these embodiments may improve the performance of the radio access network and thereby provide benefits such as, e.g., reduced user waiting time, relaxed restriction on file size, better responsiveness, and/or extended battery lifetime.

A measurement procedure may be provided for the purpose of monitoring data rate, latency, and other factors on which the one or more embodiments improve. There may further be an optional network functionality for reconfiguring the OTT connection 1550 between the host computer 1510 and the UE 1530, in response to variations in the measurement results. The measurement procedure and/or the network functionality for reconfiguring the OTT connection 1550 may be implemented in the software 1511 and the hardware 1515 of the host computer 1510 or in the software 1531 and the hardware 1535 of the UE 1530, or both. In some embodiments, sensors (not shown) may be deployed in or in association with communication devices through which the OTT connection 1550 passes; the sensors may participate in the measurement procedure by supplying values of the monitored quantities exemplified above, or supplying values of other physical quantities from which the software 1511, 1531 may compute or estimate the monitored quantities. The reconfiguring of the OTT connection 1550 may include message format, retransmission settings, preferred routing, etc.; the reconfiguring need not affect the base station 1520, and it may be unknown or imperceptible to the base station 1520. Such procedures and functionalities may be known and practiced in the art. In certain embodiments, measurements may involve proprietary UE signaling facilitating the host computer 1510's measurements of throughput, propagation times, latency, and the like. The measurements may be implemented in that the software 1511 and 1531 causes messages to be transmitted, in particular empty or 'dummy' messages, using the OTT connection 1550 while it monitors propagation times, errors, etc.

Figures 16, 17:
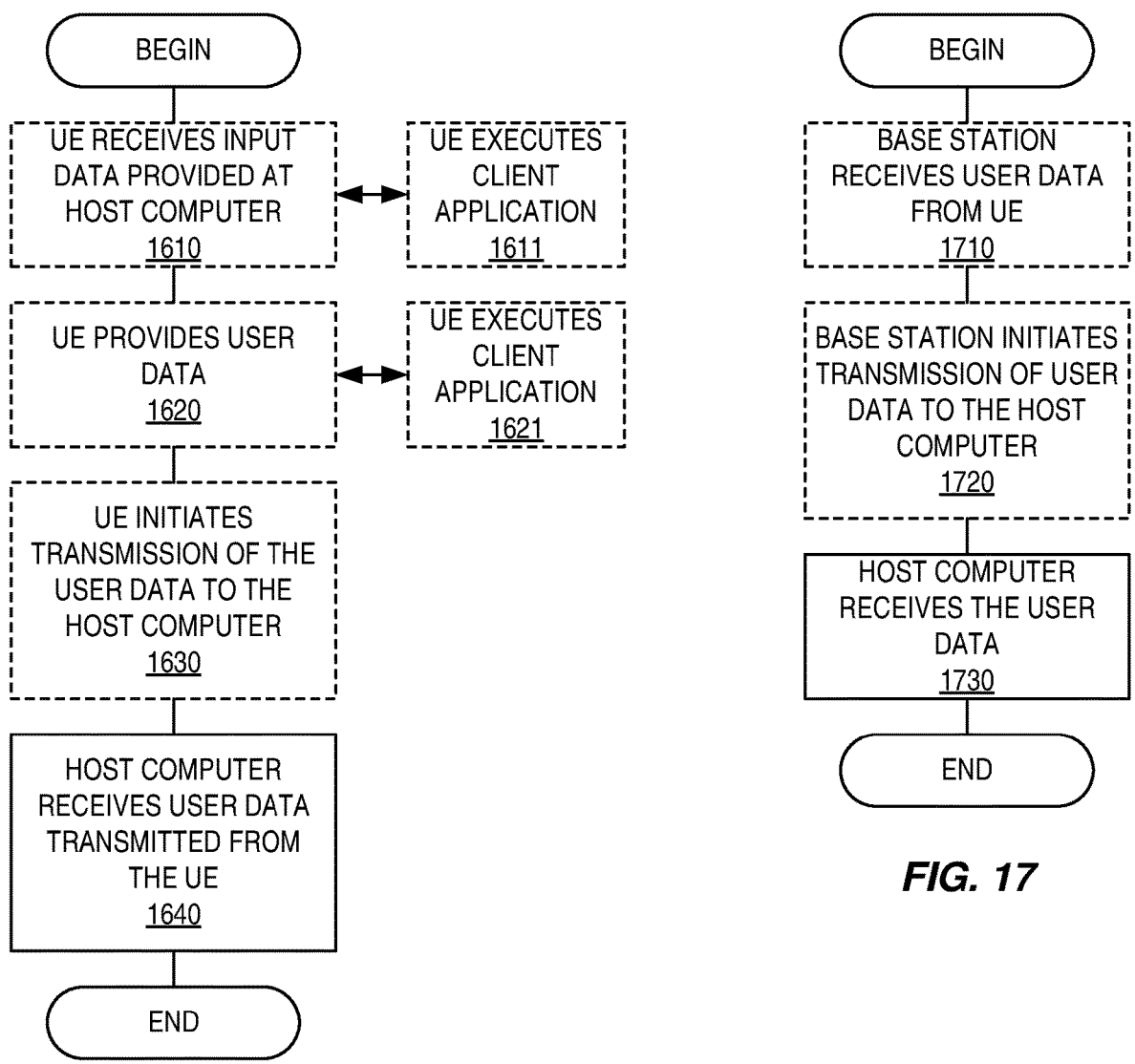
FIG. 16 is a flowchart illustrating a method implemented in a communication system in accordance with one embodiment of the present disclosure.
FIG. 17 is a flowchart illustrating a method implemented in a communication system in accordance with another embodiment of the present disclosure.

FIG. 16 is a flowchart illustrating a method implemented in a communication system, in accordance with one embodiment. The communication system includes a host computer, a base station, and a UE which may be those described with reference to FIGS. 14 and 15. For simplicity of the present disclosure, only drawing references to FIG. 16 will be included in this section. In step 1610 (which may be optional), the UE receives input data provided by the host computer. Additionally or alternatively, in step 1620, the UE provides user data. In sub-step 1621 (which may be optional) of step 1620, the UE provides the user data by executing a client application. In sub-step 1611 (which may be optional) of step 1610, the UE executes a client application which provides the user data in reaction to the received input data provided by the host computer. In providing the user data, the executed client application may further consider user input received from the user. Regardless of the specific manner in which the user data was provided, the UE initiates, in sub-step 1630 (which may be optional), transmission of the user data to the host computer. In step 1640 of the method, the host computer receives the user data transmitted from the UE, in accordance with the teachings of the embodiments described throughout this disclosure.

FIG. 17 is a flowchart illustrating a method implemented in a communication system, in accordance with one embodiment. The communication system includes a host computer, a base station, and a UE which may be those described with reference to FIGS. 14 and 15. For simplicity of the present disclosure, only drawing references to FIG. 17 will be included in this section. In step 1710 (which may be optional), in accordance with the teachings of the embodiments described throughout this disclosure, the base station receives user data from the UE. In step 1720 (which may be optional), the base station initiates transmission of the received user data to the host computer. In step 1730 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processors (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Some example embodiments are as follows.

GROUP A EMBODIMENTS

Embodiment 1: A method of operation of a wireless communication device for transmitting a physical uplink channel in a wireless communication system, comprising:
- transmitting (500) a sounding reference signal on a first set of frequency-domain resources;
- receiving (502) an uplink scheduling assignment for an uplink physical channel, the uplink scheduling assignment comprising a resource allocation of a second set of frequency-domain resources, wherein the second set of frequency-domain resources comprises: (a) one or more frequency-domain resources that are also included in the first set of frequency-domain resources and (b) one or more frequency-domain resources that are not included in the first set of frequency-domain resources;
- in order to form a precoded uplink channel:
  - for each frequency-domain resource of one or more frequency-domain resources comprised in both the first set of frequency-domain resources and the second set of frequency-domain resources, applying a same precoding to the uplink physical channel on the frequency-domain resource as applied to the sourcing reference signal on the frequency-domain resource; and
  - for each frequency-domain resource of the one or more frequency-domain resources comprised in the second set of frequency-domain resources but not included in the first set of frequency-domain resources, applying a same precoding to the uplink physical channel on the frequency-domain resource as applied to the sounding reference signal on a different frequency-domain resource; and
transmitting the precoded uplink channel.

Embodiment 2: The method of embodiment 1 wherein the uplink scheduling assignment further comprises an indication to apply the same precoding to the physical uplink channel as applied to the transmitted sounding reference signal.

Embodiment 3: The method of embodiment 1 or 2 wherein, for each frequency-domain resource of the one or more frequency-domain resources comprised in the second set of frequency-domain resources but not included in the first set of frequency-domain resources, applying the same precoding to the uplink physical channel on the frequency-domain resource as applied to the sounding reference signal on the different frequency-domain resource comprises applying the same precoding to the uplink physical channel on the frequency-domain resource as applied to the sounding reference signal on another frequency-domain resource that is: (a) in the first set of frequency-domain resources and (b) minimizes an absolute distance in resource index from the frequency-domain resource.

Embodiment 4: The method of any one of embodiments 1 to 3 wherein the precoding applied to the sounding reference signal on a first frequency-domain resource in the first set of frequency-domain resources is different than the precoding applied to the sounding reference signal on a second frequency-domain resource in the first set of frequency-domain resources.

Embodiment 5: A method of operation of a wireless communication device for transmitting a physical uplink channel in a wireless communication system, comprising: transmitting (600) a sounding reference signal in a first time instant using a first precoder on a first set of subcarriers, the first set of subcarriers being comprised within a first resource group of subcarriers over which precoders are presumed to remain constant; transmitting (602) the sounding reference signal in a second time instant after the first time instant using a second precoder on a second set of subcarriers, the second set of subcarriers being comprised within a second resource group of subcarriers over which precoders are presumed to remain constant; and transmitting (604) a physical uplink channel that occupies at least part of the first resource group and at least part of the second resource group such that a network node of the wireless communication system can assume that the first precoder and the second precoder are used to transmit the physical uplink channel on the first resource group and the second resource group, respectively.

Embodiment 6: A method of operation of a wireless communication device for transmitting an uplink physical channel in a wireless communication system, comprising: receiving (700) signaling that configures the wireless communication device to receive a Sounding Reference Signal, SRS, resource indication; expecting (702) that the wireless communication device will not be configured with a Physical Resource Block Group, PRG, size that is less than the scheduled bandwidth or expecting (702) that the wireless communication device will not be configured with a PRG size; and receiving (704) the SRS resource indication and transmitting the uplink physical channel according to the SRS resource indication.

Embodiment 7: A method of operation of a wireless communication device for transmitting an uplink physical channel in a wireless communication system, comprising: indicating, by the wireless communication device, that it is only capable of non-coherent transmission;
receiving signaling that configures the wireless communication device to receive a Sounding Reference Signal, SRS, resource indication;
expecting, by the wireless communication device, that:
the wireless communication device will not be configured with a Physical Resource Block Group, PRG, size less than the full scheduled bandwidth;
the wireless communication device will not be configured with a PRG size; and/or
the wireless communication device will not be configured to transmit precoded SRS; and
receiving the SRS resource indication and transmitting the uplink physical channel according to the SRS resource indication.

Embodiment 8: The method of any of the previous embodiments, further comprising: providing user data; and forwarding the user data to a host computer via the transmission to a base station.

GROUP B EMBODIMENTS

Embodiment 9: A wireless device for transmitting a physical uplink channel in a wireless communication system, the wireless device comprising: at least one transmitter and at least one receiver; and processing circuitry configured to perform any of the steps of any of the Group A embodiments.

Embodiment 10: A communication system including a host computer comprising: a communication interface configured to receive user data originating from a transmission from a User Equipment, UE, to a base station; wherein the UE comprises a radio interface and processing circuitry, the UE's processing circuitry configured to perform any of the steps of any of the Group A embodiments.

Embodiment 11: The communication system of the previous embodiment, further including the UE.

Embodiment 12: The communication system of the previous 2 embodiments, further including the base station, wherein the base station comprises a radio interface configured to communicate with the UE and a communication interface configured to forward to the host computer the user data carried by a transmission from the UE to the base station.

Embodiment 13: The communication system of the previous 3 embodiments, wherein: the processing circuitry of the host computer is configured to execute a host application; and the UE's processing circuitry is configured to execute a client application associated with the host application, thereby providing the user data.

Embodiment 14: The communication system of the previous 4 embodiments, wherein: the processing circuitry of the host computer is configured to execute a host application, thereby providing request data; and the UE's processing circuitry is configured to execute a client application associated with the host application, thereby providing the user data in response to the request data.

Embodiment 15: A method implemented in a communication system including a host computer, a base station, and a User Equipment, UE, the method comprising: at the host computer, receiving user data transmitted to the base station from the UE, wherein the UE performs any of the steps of any of the Group A embodiments.

Embodiment 16: The method of the previous embodiment, further comprising, at the UE, providing the user data to the base station.

Embodiment 17: The method of the previous 2 embodiments, further comprising: at the UE, executing a client application, thereby providing the user data to be transmitted; and at the host computer, executing a host application associated with the client application.

Embodiment 18: The method of the previous 3 embodiments, further comprising: at the UE, executing a client application; and at the UE, receiving input data to the client application, the input data being provided at the host computer by executing a host application associated with the client application; wherein the user data to be transmitted is provided by the client application in response to the input data.

Embodiment 19: A method implemented in a communication system including a host computer, a base station, and a User Equipment, UE, the method comprising: at the host computer, receiving, from the base station, user data originating from a transmission which the base station has received from the UE, wherein the UE performs any of the steps of any of the Group A embodiments.

Embodiment 20: The method of the previous embodiment, further comprising at the base station, receiving the user data from the UE.

Embodiment 21: The method of the previous 2 embodiments, further comprising at the base station, initiating a transmission of the received user data to the host computer.

ABBREVIATIONS

At least some of the following abbreviations may be used in this disclosure. If there is an inconsistency between abbreviations, preference should be given to how it is used above. If listed multiple times below, the first listing should be preferred over any subsequent listing(s).
3GPP Third Generation Partnership Project
5G Fifth Generation
AP Access Point
ASIC Application Specific Integrated Circuit
BW Bandwidth
BWP Bandwidth Part
CP-OFDM Cyclic Prefix Orthogonal Frequency Division Multiplexing
CPU Central Processing Unit
CSI-RS Channel State Information Reference Signal
DCI Downlink Control Information
DSP Digital Signal Processor
eNB Enhanced or Evolved Node B
FDD Frequency Division Duplexing
FPGA Field Programmable Gate Array
gNB New Radio Node B
ID Identifier
IE Information Element
LTE Long Term Evolution
MCS Modulation and Coding State
MIMO Multiple Input Multiple Output
MME Mobility Management Entity
MTC Machine-Type Communication
NR New Radio
OFDM Orthogonal Frequency Division Multiplexing
OTT Over-the-Top
P-GW Packet Gateway
PRB Physical Resource Block
PRG Physical Resource Block Group
PUSCH Physical Uplink Shared Channel
QCL Quasi Co-Location
RAM Random Access Memory
RAN Radio Access Network
RBG Resource Block Group
Rel Release
ROM Read Only Memory
RRC Radio Resource Control
RRH Remote Radio Head
RX Reception
SCEF Service Capability Exposure Function
SRI Sounding Reference Signal Resource Indicator
SRS Sounding Reference Signal
SVD Singular Value Decomposition
TDD Time Division Duplexing
TFRE Time/Frequency Resource Element
TPMI Transmit Precoding Matrix Indicator
TRI Transmission Rank Indicator
TRP Transmit/Receive Point
TS Technical Specification
TX Transmission
UE User Equipment

What is claimed is:

1. A method of operation of a wireless communication device for transmitting a physical uplink channel in a wireless communication system, comprising:
transmitting a sounding reference signal on one or more sounding reference signal resources in a first set of frequency-domain resources, the sounding reference signal being frequency-selectively precoded such that a precoder used to precode the sounding reference signal in a first subset of the first set of frequency-domain resources is different than a precoder used to precode the sounding reference signal in a second subset of the first set of frequency-domain resources, wherein the first subset and the second subset are non-overlapping;
receiving an uplink scheduling assignment for an uplink physical channel, the uplink scheduling assignment comprising a resource allocation of a second set of frequency-domain resources, wherein the second set of frequency-domain resources comprises: (a) one or more frequency-domain resources that are also included in the first set of frequency-domain resources and (b) one or more frequency-domain resources that are not included in the first set of frequency-domain resources;
in order to form a precoded uplink channel:
for each frequency-domain resource of one or more frequency-domain resources comprised in both the first set of frequency-domain resources and the second set of frequency-domain resources, applying a same precoding to the uplink physical channel on the frequency-domain resource as applied to the sounding reference signal on the frequency-domain resource; and
for each frequency-domain resource of the one or more frequency-domain resources comprised in the second set of frequency-domain resources but not included in the first set of frequency-domain resources, applying a same precoding to the uplink physical channel on the frequency-domain resource as applied to the sounding reference signal on a different frequency-domain resource; and
transmitting the precoded uplink channel.

2. The method of claim 1 wherein the uplink scheduling assignment further comprises an indication to apply the same precoding to the physical uplink channel as applied to the transmitted sounding reference signal.

3. The method of claim 1 wherein, for each frequency-domain resource of the one or more frequency-domain resources comprised in the second set of frequency-domain resources but not included in the first set of frequency-domain resources, applying the same precoding to the uplink physical channel on the frequency-domain resource as applied to the sounding reference signal on the different frequency-domain resource comprises applying the same precoding to the uplink physical channel on the frequency-domain resource as applied to the sounding reference signal on another frequency-domain resource that is: (a) in the first set of frequency-domain resources and (b) minimizes an absolute distance in a resource index from the frequency-domain resource.

4. The method of claim 1 wherein the precoding applied to the sounding reference signal on a first frequency-domain resource in the first set of frequency-domain resources is different than the precoding applied to the sounding reference signal on a second frequency-domain resource in the first set of frequency-domain resources.

5. A wireless communication device for transmitting a physical uplink channel in a wireless communication system, comprising one or more transmitters, one or more receivers, and processing circuitry configured to cause the wireless communication device to:

transmit a sounding reference signal on one or more sounding reference signal resources in a first set of frequency-domain resources, the sounding reference signal being frequency-selectively precoded such that a precoder used to precode the sounding reference signal in a first subset of the first set of frequency-domain resources is different than a precoder used to precode the sounding reference signal in a second subset of the first set of frequency-domain resources, wherein the first subset and the second subset are non-overlapping;

receive an uplink scheduling assignment for an uplink physical channel, the uplink scheduling assignment comprising a resource allocation of a second set of frequency-domain resources, wherein the second set of frequency-domain resources comprises: (a) one or more frequency-domain resources that are also included in the first set of frequency-domain resources and (b) one or more frequency-domain resources that are not included in the first set of frequency-domain resources;

in order to form a precoded uplink channel:

for each frequency-domain resource of one or more frequency-domain resources comprised in both the first set of frequency-domain resources and the second set of frequency-domain resources, apply a same precoding to the uplink physical channel on the frequency-domain resource as applied to the sounding reference signal on the frequency-domain resource; and for each frequency-domain resource of the one or more frequency-domain resources comprised in the second set of frequency-domain resources but not included in the first set of frequency-domain resources, apply a same precoding to the uplink physical channel on the frequency-domain resource as applied to the sounding reference signal on a different frequency-domain resource; and transmit the precoded uplink channel.

6. The wireless communication device of claim 5 wherein the uplink scheduling assignment further comprises an indication to apply the same precoding to the physical uplink channel as applied to the transmitted sounding reference signal.

7. The wireless communication device of claim 5 wherein, for each frequency-domain resource of the one or more frequency-domain resources comprised in the second set of frequency-domain resources but not included in the first set of frequency-domain resources, in order to apply the same precoding to the uplink physical channel on the frequency-domain resource as applied to the sounding reference signal on the different frequency-domain resource, the processing circuitry is further configured to cause the wireless communication device to apply the same precoding to the uplink physical channel on the frequency-domain resource as applied to the sounding reference signal on another frequency-domain resource that is: (a) in the first set of frequency-domain resources and (b) minimizes an absolute distance in a resource index from the frequency-domain resource.

8. The wireless communication device of claim 5 wherein the precoding applied to the sounding reference signal on a first frequency-domain resource in the first set of frequency-domain resources is different than the precoding applied to the sounding reference signal on a second frequency-domain resource in the first set of frequency-domain resources.

* * * * *